US008064944B2

(12) United States Patent
Yun

(10) Patent No.: US 8,064,944 B2
(45) Date of Patent: *Nov. 22, 2011

(54) POWER CONTROL WITH SIGNAL QUALITY ESTIMATION FOR SMART ANTENNA COMMUNICATIONS SYSTEMS

(75) Inventor: Louis C. Yun, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1416 days.

This patent is subject to a terminal disclaimer.

(21) Appl. No.: 11/377,592

(22) Filed: Mar. 15, 2006

(65) Prior Publication Data

US 2007/0173277 A1 Jul. 26, 2007

Related U.S. Application Data

(63) Continuation of application No. 10/231,782, filed on Aug. 28, 2002, now Pat. No. 7,035,661, which is a continuation-in-part of application No. 09/020,049, filed on Feb. 6, 1998, now Pat. No. 6,463,295, which is a continuation-in-part of application No. 08/729,387, filed on Oct. 11, 1996, now Pat. No. 6,047,189.

(51) Int. Cl.
*H04B 7/00* (2006.01)

(52) U.S. Cl. .......... 455/522; 455/69; 455/67.11

(58) Field of Classification Search .......... 455/69, 455/522, 562.1, 63.1, 517, 67.11–67.13, 455/296, 560, 277.1, 276.1
See application file for complete search history.

(56) References Cited

U.S. PATENT DOCUMENTS

| | | | |
|---|---|---|---|
| 3,704,465 A | 11/1972 | Masak et al. |
| 3,774,209 A | 11/1973 | Fleming et al. |
| 3,798,645 A | 3/1974 | Baurle et al. |
| 3,852,749 A | 12/1974 | Kohler |
| 3,946,385 A | 3/1976 | Ewen |
| 4,005,379 A | 1/1977 | Lerner |
| 4,035,746 A | 7/1977 | Covington, Jr. |
| 4,085,319 A | 4/1978 | Deitz et al. |
| 4,128,740 A | 12/1978 | Graziano |
| 4,263,568 A | 4/1981 | Nemit |
| 4,316,191 A | 2/1982 | Sawatari et al. |
| 4,375,622 A | 3/1983 | Hollingsworth et al. |
| 4,434,505 A | 2/1984 | Gutleber |

(Continued)

FOREIGN PATENT DOCUMENTS

CA 2268269 12/2004

(Continued)

OTHER PUBLICATIONS

Acampora, et al., "A New Adaptive MAC Layer Protocol for Wireless ATM Networks in Harsh Fading and Interference Environments", 1997 IEEE, (1997), 410-415.

(Continued)

*Primary Examiner* — Lana N Le
(74) *Attorney, Agent, or Firm* — Blakely, Sokoloff, Taylor & Zafman LLP

(57) ABSTRACT

A method for power control with signal quality estimation for smart antenna communications system is described. The method, for example, starts with a transmit power assignment. Receive weight vector determination is carried out with this assigned transmit power, and the new weights used. An estimate of the resulting received signal quality is obtained and used for another power adjustment.

12 Claims, 10 Drawing Sheets

U.S. PATENT DOCUMENTS

| | | |
|---|---|---|
| 4,475,010 A | 10/1984 | Huensch et al. |
| 4,626,859 A | 12/1986 | Stansfield |
| 4,639,732 A | 1/1987 | Acoraci et al. |
| 4,639,914 A | 1/1987 | Winters |
| 4,658,096 A | 4/1987 | West, Jr. et al. |
| 4,737,794 A | 4/1988 | Jones |
| 4,737,975 A | 4/1988 | Shafer |
| 4,742,356 A | 5/1988 | Kuipers |
| 4,750,147 A | 6/1988 | Roy, III et al. |
| 4,775,997 A | 10/1988 | West, Jr. et al. |
| 4,796,291 A | 1/1989 | Makino |
| 4,827,395 A | 5/1989 | Anders et al. |
| 4,829,554 A | 5/1989 | Barnes et al. |
| 4,837,800 A | 6/1989 | Freeburg et al. |
| 4,855,748 A | 8/1989 | Brandao et al. |
| 4,910,794 A | 3/1990 | Mahany |
| 4,922,517 A | 5/1990 | West, Jr. et al. |
| 4,926,186 A | 5/1990 | Kelly et al. |
| 4,940,963 A | 7/1990 | Gutman et al. |
| 4,947,452 A | 8/1990 | Hattori et al. |
| 4,955,082 A | 9/1990 | Hattori et al. |
| 4,965,732 A | 10/1990 | Roy, III et al. |
| 4,965,849 A | 10/1990 | Kunihiro |
| 4,965,850 A | 10/1990 | Schloemer |
| 4,972,151 A | 11/1990 | Rosen |
| 4,989,204 A | 1/1991 | Shimizu et al. |
| 5,041,833 A | 8/1991 | Weinberg |
| 5,052,799 A | 10/1991 | Sasser et al. |
| 5,093,924 A | 3/1992 | Toshiyuki et al. |
| 5,103,459 A | 4/1992 | Gilhousen et al. |
| 5,109,535 A | 4/1992 | Kume et al. |
| 5,124,697 A | 6/1992 | Moore |
| 5,142,253 A | 8/1992 | Mallavarpu et al. |
| 5,159,593 A | 10/1992 | D'Amico et al. |
| 5,255,210 A | 10/1993 | Gardner et al. |
| 5,260,968 A | 11/1993 | Gardner et al. |
| 5,262,789 A | 11/1993 | Silverstein |
| 5,274,844 A | 12/1993 | Harrison et al. |
| 5,276,907 A | 1/1994 | Meidan |
| 5,283,540 A | 2/1994 | Myer |
| 5,299,148 A | 5/1994 | Gardner et al. |
| 5,335,249 A | 8/1994 | Krueger et al. |
| 5,345,596 A | 9/1994 | Buchenhorner et al. |
| 5,361,303 A | 11/1994 | Eatwell |
| 5,367,559 A | 11/1994 | Kay et al. |
| 5,379,320 A | 1/1995 | Fernandes et al. |
| 5,387,915 A | 2/1995 | Moussa et al. |
| 5,423,072 A | 6/1995 | Iwashita et al. |
| 5,430,760 A | 7/1995 | Dent |
| 5,440,281 A | 8/1995 | Wey et al. |
| 5,448,621 A | 9/1995 | Knudsen |
| 5,457,812 A | 10/1995 | Siira et al. |
| 5,465,399 A | 11/1995 | Oberholtzer et al. |
| 5,471,647 A | 11/1995 | Gerlach et al. |
| 5,475,864 A | 12/1995 | Hamabe |
| 5,475,868 A | 12/1995 | Duque-Anton et al. |
| 5,497,505 A | 3/1996 | Koohgoli et al. |
| 5,515,378 A | 5/1996 | Roy, III et al. |
| 5,530,449 A | 6/1996 | Wachs et al. |
| 5,530,917 A | 6/1996 | Andersson et al. |
| 5,532,706 A | 7/1996 | Reinhardt et al. |
| 5,537,438 A | 7/1996 | Mourot et al. |
| 5,543,801 A | 8/1996 | Shawyer |
| 5,546,090 A | 8/1996 | Roy, III et al. |
| 5,548,813 A | 8/1996 | Charas et al. |
| 5,553,074 A | 9/1996 | Acampora |
| 5,555,445 A | 9/1996 | Booth |
| 5,557,657 A | 9/1996 | Barnett |
| 5,565,873 A | 10/1996 | Dean |
| 5,566,209 A | 10/1996 | Forssen et al. |
| 5,576,717 A | 11/1996 | Searle et al. |
| 5,592,490 A * | 1/1997 | Barratt et al. ................ 370/329 |
| 5,596,625 A | 1/1997 | LeBlanc |
| 5,603,082 A | 2/1997 | Hamabe |
| 5,603,089 A | 2/1997 | Searle et al. |
| 5,606,729 A | 2/1997 | D'Amico et al. |
| 5,615,406 A | 3/1997 | Sasaki et al. |
| 5,621,752 A | 4/1997 | Antonio |
| 5,625,885 A | 4/1997 | Nakazawa et al. |
| 5,649,287 A | 7/1997 | Forssen et al. |
| 5,673,291 A | 9/1997 | Dent |
| 5,675,581 A | 10/1997 | Soliman |
| 5,678,188 A | 10/1997 | Hisamura |
| 5,683,375 A | 11/1997 | Osborn, III et al. |
| 5,684,836 A | 11/1997 | Nagayasu et al. |
| 5,689,219 A | 11/1997 | Piirainen |
| 5,689,502 A | 11/1997 | Scott |
| 5,694,416 A | 12/1997 | Johnson |
| 5,697,066 A | 12/1997 | Acampora |
| 5,726,978 A | 3/1998 | Frodigh et al. |
| 5,732,076 A | 3/1998 | Ketseoglou et al. |
| 5,742,904 A | 4/1998 | Pinder et al. |
| 5,745,858 A | 4/1998 | Sato et al. |
| 5,748,676 A | 5/1998 | Mahany |
| 5,752,165 A | 5/1998 | Hokkanen |
| 5,774,461 A | 6/1998 | Hyden et al. |
| 5,809,009 A | 9/1998 | Matsuoka et al. |
| 5,809,019 A | 9/1998 | Ichihara et al. |
| 5,812,090 A | 9/1998 | Chevalier et al. |
| 5,818,918 A | 10/1998 | Fujii |
| 5,819,182 A | 10/1998 | Gardner et al. |
| 5,825,762 A | 10/1998 | Kamin, Jr. et al. |
| 5,828,658 A | 10/1998 | Ottersten et al. |
| 5,845,212 A | 12/1998 | Tanaka |
| 5,867,123 A | 2/1999 | Geyh et al. |
| 5,870,393 A | 2/1999 | Yano et al. |
| 5,884,148 A | 3/1999 | Bilgic et al. |
| 5,887,038 A | 3/1999 | Golden |
| 5,905,721 A | 5/1999 | Liu |
| 5,909,470 A | 6/1999 | Barratt et al. |
| 5,914,946 A | 6/1999 | Avidor et al. |
| 5,930,243 A | 7/1999 | Parish et al. |
| 5,933,421 A | 8/1999 | Alamouti et al. |
| 5,955,992 A | 9/1999 | Shattil |
| 5,970,394 A | 10/1999 | Arpee et al. |
| 5,973,638 A | 10/1999 | Robbins et al. |
| 5,999,826 A | 12/1999 | Whinnett |
| 6,005,854 A | 12/1999 | Xu et al. |
| 6,009,124 A | 12/1999 | Smith et al. |
| 6,018,317 A | 1/2000 | Dogan et al. |
| 6,018,555 A | 1/2000 | Mahany |
| 6,018,643 A | 1/2000 | Golemon et al. |
| 6,023,203 A | 2/2000 | Parish |
| 6,047,189 A | 4/2000 | Yun et al. |
| 6,061,553 A | 5/2000 | Matsuoka et al. |
| 6,064,865 A | 5/2000 | Kuo et al. |
| 6,067,324 A | 5/2000 | Harrison |
| 6,108,565 A | 8/2000 | Scherzer |
| 6,131,016 A | 10/2000 | Greenstein et al. |
| 6,154,661 A * | 11/2000 | Goldburg .................. 455/562.1 |
| 6,185,412 B1 | 2/2001 | Pentikainen et al. |
| 6,192,256 B1 | 2/2001 | Whinnett |
| 6,240,098 B1 * | 5/2001 | Thibault et al. ............ 455/562.1 |
| 6,337,985 B1 | 1/2002 | Roux et al. |
| 6,377,812 B1 * | 4/2002 | Rashid-Farrokhi et al. .. 455/522 |
| 6,463,295 B1 * | 10/2002 | Yun ............................... 455/522 |
| 6,754,473 B1 * | 6/2004 | Choi et al. ...................... 455/69 |
| 6,888,809 B1 * | 5/2005 | Foschini et al. ............... 455/101 |
| 7,035,661 B1 | 4/2006 | Yun |
| 2002/0027985 A1 * | 3/2002 | Rashid-Farrokhi ........ 455/67.11 |
| 2002/0102984 A1 * | 8/2002 | Furuskar et al. .............. 455/452 |
| 2004/0002364 A1 | 1/2004 | Trikkonen et al. |
| 2004/0018818 A1 | 1/2004 | Hottinen et al. |
| 2004/0033782 A1 * | 2/2004 | Horng et al. ..................... 455/69 |
| 2004/0106412 A1 * | 6/2004 | Laroia et al. .................. 455/522 |
| 2004/0198228 A1 | 10/2004 | Raghothaman |
| 2004/0219883 A1 | 11/2004 | Pauli et al. |
| 2006/0153062 A1 * | 7/2006 | Tanabe et al. ................. 370/329 |
| 2008/0242309 A1 * | 10/2008 | Borst et al. ................ 455/562.1 |

FOREIGN PATENT DOCUMENTS

| | | |
|---|---|---|
| CN | 1246995 | 3/2000 |
| CN | 1310439 | 4/2007 |
| CN | 101026398 | 8/2007 |
| DE | 69916579 | 4/2005 |
| DE | 69733903 | 6/2006 |
| EP | 0565507 | 10/1993 |

| | | |
|---|---|---|
| EP | 0639035 | 2/1995 |
| EP | 0665665 | 8/1995 |
| EP | 0713261 | 5/1996 |
| EP | 0777400 | 6/1997 |
| EP | 0786914 | 7/1997 |
| EP | 1051811 | 4/2004 |
| EP | 1013013 | 8/2005 |
| GB | 2237706 | 5/1991 |
| GB | 2295524 | 5/1996 |
| GB | 2313261 | 11/1997 |
| JP | 07095151 | 4/1995 |
| JP | 7170548 | 7/1995 |
| JP | 4151990 | 7/2008 |
| WO | WO-9534103 | 12/1995 |
| WO | WO-9622662 | 7/1996 |
| WO | WO-9708849 | 3/1997 |
| WO | WO-9801963 | 1/1998 |
| WO | WO-9817037 | 4/1998 |
| WO | WO-9817071 | 7/1998 |
| WO | WO-9828864 | 7/1998 |
| WO | WO-9833346 | 7/1998 |

OTHER PUBLICATIONS

Agee, et al., "Blind Seperation and Capture of Communication Signals Using a Multitarget Constant Modulus Beamformer", Proc. IEEE Military Communications Conference, vol. 2, (Oct. 7, 1998), 1-12.

Aschied, et al., "An All Digital Receiver Architecture for Bandwidth Efficient Transmission at High Data Rates", IEEE Transactions on Communications, vol. 37, No. 8, (1989), 804-813.

Farsakh, et al., "A Real Time Downlink Channel Allocation Scheme for an SDMA Mobile Radio System", IEEE International Symposium on Personal, Indoor and Mobile Radio Communications, vol. 3, (Oct. 18, 1996), 1215-1220.

Farsakh, et al., "Channel Allocation and Downlink Beamforming in an SDMA Mobile Radio System", PIMRC '95, Wireless: Merging onto the Information Superhighway, 6th IEEE International Symposium, Totonto, Ont. Canada, (Sep. 27-29, 1995), 687-691.

Franks, "Synchronization Subsystems: Analysis and Design", Digital Communications Satellite/Earth Station Engineering, (1981), 294-335.

Friedlander, et al., "Direction Finding for Wideband Signals Using an Interpolated Array", IEEE Publication, (1991), 583-587.

Friedlander, "Direction Finding Using an Interpolated Array", International Conference on Acoustics, Speach and Signal Processing, vol. 5, (Apr. 3, 1990), 2951-2954.

Ganz, et al., "A Data-Derived Reference Signal Technique for Adaptive Arrays", IEEE Transactions on Communications, vol. 37, No. 9, (Sep. 1989), 975-983.

Gerlach, et al., "Base Station Transmitter Antenna Arrays with Mobile to Base Feedback", IEEE Asilomar Conference on Signals, Systems & Computers, (1993), 1432-1436.

Iltis, et al., "A Digital DS Spread-Spectrum Receiver With Joint Channel and Doppler Shift Estimation", IEEE Transactions on Communications, vol. 39, No. 8, (Aug. 1991), 1255-1267.

Krishnamurthy, et al., "Polling Based Media Access Protocols For Use With Smart Adaptive Array Antennas", IEEE, (1998), 337-344.

Lee, et al., "Decision Directed Carrier Recovery—Chapter 16: Carrier Recovery", Digital Communications, 2nd Edition, Kluwer Academic Pub., (1994), 725-764.

Lee, et al., "Decision Directed Carrier Recovery—Chapter 17: Timing Recovery", Digital Communications, 2nd Edition, Kluwer Academic Pub., (1994), 737-764.

Lundell, et al., "Applications of the Constant Modulus Adaptive Beamformer to Constant and Non-Constant Modulus Signals", Proceedings, 1998 Asilomar Conference on Signals, Systems, and Computers (ACSSC-1988), (1988), 432-436.

Muhamed, et al., "Direction of Arrival Estimation Using Antenna Arrays", The Bradley Dept. of Electrical Engineering, Mobile and Portable Radio Research Group, Section 3.8, (1996), 64-71.

Ottersten, B. , "Array Processing for Wireless Communications", Proc. 8th IEEE Signal Processing Workshop on Statistical Signal and Array Proc., (Jun. 1996), 466-473.

Papadias, et al., "A Space-Time Constant Modulus Algorithm for SDMA Systems", Proceedings, IEEE 46th Vehicular Technology Conference, (1996), 86-90.

Rashid-Farrokhi, F. , et al., "Downlink and Uplink Capacity Enhancement in Power Controlled Cellular Systems", Proceedings, 1997 IEEE 47th Vehicular Technology Conference, vol. 2, May 4-7, 1997, New York, NY IEEE, (1997), 647-651.

Rashid-Farrokhi, F. , "Downlink Power Control and Base Station Assignment", IEEE Communications Letters, vol. 1, No. 4, (Jul. 1997), 102-104.

Rashid-Farrokhi, F. , et al., "Joint Power Control and Beamforming for Capacity Improvement in Wireless Networks with Antenna Arrays", Conference Record, IEEE Globecom, vol. 1, New York, NY IEEE, (1996), 555-559.

Rashid-Farrokhi, F. , et al., "Transmit Diversity and Equalization for Power Controlled Wireless Networks", Conference Record, 31st Asilomar Conference on Signals, Systems and Computers, vol. 1, Conference Date Nov. 2-5, 1997, New York, NY IEEE, (1997), 620-624.

Rashid-Farrokhi, F. , et al., "Transmit Beamforming for Cellular Communication Systems", Conference on Information Sciences and Systems (CISS-07), (Mar. 1997).

Swidlehurst, et al., "Analysis of a Decision Directed Beamformer", IEEE Transactions on Signal Processing, vol. 43, No. 12, (Dec. 1995), 2920-2927.

Talwar, et al., "Blind Estimation of Multiple Co-Channel Digital Signals Arriving at an Antenna Array", 1993, Proc. 27th Asilomar Conference on Signals, Systems and Computers, vol. 1, (1993), 349-342.

Talwar et al. Recursive Algorithms for Estimating Multiple Co-Channel Digital Signals Received at an Antenna Array, Proceedings of the Fifth Annual IEEE Dual Use Technologies and Applications Conference, May 1995.

Van Der Veen, et al., "A Constant Modulus Factorization Technique for Smart Antenna Applications in Mobile Communications", Advanced Signal Processing Algorithms, Architectures, and Implementations V, SPIE, vol. 2296, (1994), 230-241.

Xu, et al., "Throughput Multiplication of Wireless LANs for Multimedia Services: SDMA Protocol Design", IEEE, (1994), 1326-1332.

Zhang, et al., "Performance of a Modified Polling Strategy for Broadband Wireless LANs in a Harsh Fading Environment", GLOBECOM, (1991), 1141-1146.

Second Office Action for Chinese Application No. 200710005400.1 mailed by Chinese Associate on Jun. 3, 2010.

Non-Final Office Action for U.S. Appl. No. 08/729,387 Mailed Jun. 29, 1998, 12 pages.

Final Office Action for U.S. Appl. No. 08/729,387 Mailed Dec. 8, 1998, 19 pages.

Notice of Allowance and Fees for U.S. Appl. No. 08/729,387 Mailed Apr. 27, 1999, 6 pages.

Non-Final Office Action for Brazilian Patent Application No. PI9712288-2 Mailed Jan. 12, 2010, 4 pages.

Non-Final Office Action for China Patent Application No. 97198741.6 Mailed Aug. 2, 2002, 6 pages.

Non-Final Office Action for Japan Patent Application No. 10-518567 Mailed Oct. 23, 2007, 2 pages.

Notice of Allowance and Fees for U.S. Appl. No. 09/020,049 Mailed Jun. 21, 2002, 12 pages.

Non-Final Office Action for U.S. Appl. No. 09/020,049 Mailed Oct. 10, 2001, 21 pages.

Non-Final Office Action for U.S. Appl. No. 09/020,049 Mailed Apr. 12, 2001, 15 pages.

Notice of Allowance and Fees for U.S. Appl. No. 10/231,782 Mailed Jan. 13, 2006, 20 pages.

Non-Final Office Action for U.S. Appl. No. 10/231,782 Mailed Aug. 11, 2005, 13 pages.

Non-Final Office Action for China Patent Application No. 99802312.3 Mailed Mar. 11, 2005, 3 pages.

Non-Final Office Action for China Patent Application No. 99802312.3 Mailed Mar. 17, 2006, 6 pages.

Non-Final Office Action for China Patent Application No. 99802312.3 Mailed Aug. 19, 2005, 4 pages.

Non-Final Office Action for European Patent Application No. 99904566.9 Mailed Mar. 4, 2002, 3 pages.
Decision to Grant for European Patent Application No. 99904566.9 Mailed Mar. 11, 2004, 3 pages.
Non-Final Office Action for European Patent Application No. 99904566.9 Mailed Jan. 21, 2003, 3 pages.
Supplementary Partial Search Report for European Patent Application No. 9790120.1 Mailed Jan. 7, 2003, 3 pages.
Decision to Grant for European Patent Application No. 9790120.1 Mailed Dec. 7, 2004, 3 pages.
International Search Report for PCT Patent Application No. PCT/US99/02339 Mailed Jul. 9, 1999, 7 pages.
PCT Written Opinion for PCT Patent Application No. PCT/US99/02339 Mailed Jan. 13, 2000, 7 pages.
International Preliminary Examination Report for PCT Patent Application No. PCT/US99/02339 Mailed May 18, 2000, 8 pages.
Non-Final Office Action for Japan Patent Application No. 2000-530987 Mailed Sep. 8, 2008, 4 pages.
PCT Written Opinion for PCT Patent Application No. PCT/US97/18612 Mailed Mar. 16, 1999, 6 pages.
International Search Report for PCT Patent Application No. PCT/US97/18612 Mailed Mar. 24, 1998, 4 pages.
International Preliminary Examination Report for PCT Patent Application No. PCT/US97/18612 Mailed Jul. 29, 1999, 5 pages.
Non-Final Office Action for Canada Patent Application No. 2,268,269 Mailed Nov. 11, 2003, 2 pages.
Notice of Allowance for Canada Patent Application No. 2,268,269 Mailed Aug. 10, 2004, 1 page.
First Office Action for Chinese Application No. 200710005400.1 mailed by Chinese Associate on Nov. 2, 2009 no translation available.
Third Office Action for Chinese Application No. 200710005400.1 mailed by Chinese Associate on Mar. 3, 2011 Translation of Office action not provided by Associate.

* cited by examiner

POWER CONTROL WITH SIGNAL QUALITY ESTIMATION FOR SMART ANTENNA COMMUNICATIONS SYSTEMS

CROSS-REFERENCE TO RELATED APPLICATION

This application is a continuation of U.S. patent application No. 10/231,782, filed Aug. 28, 2002, entitled "Power Control with Signal Quality Estimation for Smart Antenna Communications Systems", which, in turn, is a Continuation-In-Part of U.S. patent application Ser. No. 09/020,049, filed on Feb. 6, 1998, entitled "Power Control with Signal Quality Estimation for Smart Antenna Communications Systems", now U.S. Pat. No. 6,463,295, issued on Oct. 8, 2002, which, in turn, is a Continuation-In-Part of U.S. patent application Ser. No. 08/729,387, Filed on Oct. 11, 1996, entitled "Adaptive Method For Channel Assignment In a Cellular Communication System", now U.S. Pat. No. 6,047,189, issued on Apr. 4, 2000, the priority of each of which are hereby claimed.

FIELD OF INVENTION

This invention relates to the field of wireless communication systems and more particularly to controlling radiated RF power level during establishment of a call and on an ongoing basis in a cellular wireless system, such control of power using an estimate of the quality of a received angle-modulated carrier.

BACKGROUND OF THE INVENTION

In a wireless communication system, as a general rule, it is highly desirable that the minimum radiated radio frequency (RF) carrier power necessary to achieve a specified quality level of communications be used in order to conserve energy and, perhaps more importantly, in order to reduce interference with other users of a shared RF spectrum. With the increasing use of cellular wireless communication systems comprising a base station (BS) at each cell, and remote terminals (a remote terminal also is called a subscriber unit (SU) or a subscriber station) communicating with an assigned base station, the problem of interference between stations within a given cellular area, and between neighboring cells, requires intelligent interference management in order to more effectively use the allocated common RF bandwidth. Such interference management is the goal of power control. As a general rule, the minimum radiated RF power required for maintaining an acceptable quality of service should be used.

Two types of power control are necessary: initial power control, and ongoing power control. In initial power control, the goal is to initiate communications with the minimal level of power necessary to achieve an acceptable level of communications. Ongoing power control maintains minimum transmitted power usage on a link as the communication system changes over time by new links being formed while others are being established.

Initial Power Control

Several communications protocols are known for cellular systems, including, for example, the Personal Handiphone System (PHS) and the Global System for Mobile Communications (GSM). Both use time division multiple access (TDMA) together with frequency division multiple access (FDMA) techniques. Such communications protocols all include protocols for call establishment, for example for a subscriber unit initiating communications to a BS, or a BS initiating communications with a SU. Some of these protocols may not include initial power control. There thus is a need in the art for an initial power control method that may be applied to an existing communication system without adversely impacting communication system protocols that are in existence.

Ongoing Power Control

Ongoing power control is the control of radiated power as the communication environment changes after initial communications is achieved. For example, when the radiated power is increased in a particular link between a SU and a BS in order to achieve an acceptable quality for the received signal, or for some other reason, such a change may cause unacceptable quality changes for other stations using either the same or adjacent channels. In addition, as new connections are established and on-going connections are disconnected, power assignments might change resulting in changes (for better or worse) in the quality of existing connections. For example, "excess quality" may result, implying that excess RF power is being used under the new conditions. Degraded quality also may be experienced, implying that some connections may require greater radiated RF power. Variations in propagation characteristics, atmospherics, and man-made interference can also cause changes that require adjusting RF power levels. This is the goal of ongoing power control.

Spatial division multiple access (SDMA) techniques are known in which the same "conventional channel" (i.e., the same frequency channel in a frequency division multiple access (FDMA) system, timeslot in a time division multiple access (TDMA) system, code in a code division multiple access (CDMA) system, or timeslot and frequency in a TDMA/FDMA system) may be assigned to more than one subscriber station. This is done by using an antenna array of several antenna elements at the base station, and on the uplink (communications from a subscriber unit to a base station), the signal from each antenna element is weighted in amplitude and phase by a receive weight (also called spatial demultiplexing weight), all the receive weights determining a complex valued receive weight vector which is dependent on the receive spatial signature of the remote user. The receive spatial signature (also called the receive manifold vector) characterizes how the base station array receives signals from a particular subscriber unit. On the downlink (communications from the base station unit to a subscriber unit), transmission is achieved by weighting the signal to be transmitted by each array element in amplitude and phase by a set of respective transmit weights (also called spatial multiplexing weights), all the transmit weights for a particular user determining a complex-valued transmit weight vector which also is dependent on the spatial signature of the remote user. When transmitting to several remote users on the same conventional channel, the sum of weighted signals is transmitted at the antenna arrays.

The weighting of the signals either on the uplink from each antenna element in an array of antennas, or on the downlink to each antenna element is called spatial processing herein. Spatial processing is useful even when no more than one subscriber unit is assigned to any conventional channel. Thus, the term SDMA shall be used herein to include both the true spatial multiplexing case of having more than one user per conventional channel, and the use of spatial processing with only one user per conventional channel to mitigate adjacent channel interference and adjacent cell interference, reduce the cellular frequency reuse factor, etc. The term channel shall refer to a communications link between a base station and a single remote user, so that the term SDMA covers both a single channel per conventional channel, and more than one channel per conventional channel.

Methods for determining spatial receive and transmit weight vectors are known in the art. See for example, U.S. Pat. No. 5,515,378 (issued May 7, 1996) and U.S. Pat. No. 5,642,353 (issued Jun. 24, 1997) entitled SPATIAL DIVISION MULTIPLE ACCESS WIRELESS COMMUNICATION SYSTEMS, Roy, III, et al., inventors; U.S. Pat. No. 5,592,490 (issued Jan. 7, 1997) entitled SPECTRALLY EFFICIENT HIGH CAPACITY WIRELESS COMMUNICATION SYSTEMS, Barratt, et al., inventors; U.S. patent application Ser. No. 08/735,520 (filed Oct. 10, 1996), entitled SPECTRALLY EFFICIENT HIGH CAPACITY WIRELESS COMMUNICATION SYSTEMS WITH SPATIO-TEMPORAL PROCESSING, Ottersten, et al., inventors; U.S. patent application Ser. No. 08/729,390 (filed Oct. 11, 1996) entitled METHOD AND APPARATUS FOR DECISION DIRECTED DEMODULATION USING ANTENNA ARRAYS AND SPATIAL PROCESSING, Barratt, et al., inventors (hereinafter "Our Demodulation Patent"); and U.S. patent application Ser. No. 08/948,772 (filed Oct. 10, 1997) entitled METHOD AND APPARATUS FOR CALIBRATING A WIRELESS COMMUNICATION STATION HAVING AN ANTENNA ARRAY, Parish, et al., inventors (hereinafter "Our Calibration Patent"), each of these incorporated herein by reference in their entirety, these patents or applications collectively referred to herein as "Our Spatial Processing Patents". For example, in systems that use time division duplexing (TDD) so that uplink and downlink communications occurs over the same frequency (in a FDMA or a TDMA/FDMA system), a receive weight vector of receive weights determined on the uplink can be used to determine the required transmit weight vector of transmit weights for communications on the downlink from the base station to the same remote subscriber unit.

No practical methods of ongoing power control are known in the prior art that are applicable to systems using SDMA techniques, in that the power control methods can effectively adjust all of the SDMA system parameters required for minimizing the total radiated RF power while maintaining acceptable quality levels for all channels. Using SDMA introduces substantial complexities in the RF radiated power control problem because determining weight vectors affects power control, and vice versa. Any change in RF power on a conventional channel using SDMA will affect the transmit and receive weight vectors assigned to users using the same conventional channel and any change in the spatial processing effects the power required by existing users in order to maintain an adequate communication quality level. Prior art methods for power control typically do not account for the specific aspects of SDMA, and may cause instability in such an SDMA system, wherein an improper choice of transmit power adversely alters the spatial multiplexing (i.e., transmit) and demultiplexing (i.e., receive) weight vectors, causing the transmit powers to deviate further from optimum until signal quality and network capacity are both degraded.

The optimal solution of the ongoing power control problem for an SDMA system requires the simultaneous solution of the SDMA multiplexing weight assignment problem and the power assignment problem. This at the very least is an involved computational task, and to date has been an intractable and overwhelming computational task. Thus there is a need in the art for a practical near optimal method for determining spatial processing weight vectors and ongoing power control for an SDMA system.

The objective of ongoing power control problems for communications is to minimize the total power transmitted in the communication system while ensuring that a desired ("target") signal to interference-plus-noise ratio (SINR) for every connection within every cell is achieved. When expressed in this way, the resulting power control method is referred to as a globally optimal method. Such a globally optimal method in general requires communications between base stations of the system. Locally optimal methods are those for which optimality is satisfied within some subset of the overall system, for example, within a particular cell. There may be practical difficulties with directly determining a globally optimal method when dealing with a large number of intercell and intracell connections. For example, the computation time may be too long relative to the rate of change of connection conditions; and, it may not be feasible or practical to gather the necessary data, such as the path gain between every base station and every remote subscriber unit in real time. It has been shown (Yun, L. C. M., *Transport for Multimedia on Wireless Networks*, Doctoral Dissertation, University of California, Berkeley, Calif., 1995) for a non-SDMA system that, by incorporating the effects of interference coupling between cells, the localized control strategy can be made to asymptotically converge to the globally optimal solution. Thus there are advantages to having an ongoing power control strategy that uses locally optimal power control. Thus there is a need in the art for locally optimal power control methods for systems with SDMA that are "distributed," in that no inter-base station communication of power control information is required for operation.

Signal Quality Estimation

In order to implement power control, an objective measure of the quality of the received signal is required. It is generally accepted that a measure of the error in the signal is a useful objective measure of quality. It is desirable that any such measurement of error be made while normal communications are taking place.

Several prior art methods exist for estimating the quality of received signal. One class or prior art techniques uses a measure of the received signal power as a measure of the received signal quality. An example is the commonly used received signal strength indicator (RSSI). The problem with such measures is that they do not distinguish between the desired signal and any interfering signals and/or noise. To overcome this shortcoming, some prior art power control methods use a measure of the bit error rate (BER) or the easier to obtain frame error rate (FER). For example, the initial power control method used in the IS-95 CDMA standard uses FER. FER is easier to obtain in practice than the BER because cyclic redundancy check (CRC) bits usually are part of a frame structure. The FER may be viewed as an approximate indication of the BER. Two main shortcomings of BER and FER as measures include:

1. It takes a long time (many frames) to accumulate a statistically meaningful estimate of BER or FER, which may be too slow for power control; and
2. The BER (or FER) may not be only a function of power, but may also be affected by other causes of a demodulation error. For example, residual frequency offset (even after any frequency offset correction has been applied) may contribute to the modulation error.

Additionally, prior-art decision-directed modulation error estimation methods exist which have used for quality estimation an error vector that represents the difference between the received signal and an idealized model of the signal that should have been received. The idealized model is generated from the detected bits by passing the detected bits through a bits-to-symbol mapper which converts the bits to the correct symbols, and then passing the correct symbols through a pulse shaper to produce the idealized model of the signal (a reference signal). The pulse shaper also needs to undo frequency correction and undo timing alignment. The difference between the resulting idealized model of the modulated signal (with any frequency offset and timing misalignment) and the actual received signal is used to estimate the noise and interference present in the actual signal, and this is used as a quality estimate.

This prior-art decision based quality estimator has several undesirable properties, some similar to the BER and FER measures:

1. a demodulation error may cause a large error in the quality estimate by substituting an incorrect symbol in place of the actual symbol that was meant to be transmitted;
2. frequency offset contributes to the modulation error;
3. measurement of modulation error does not directly relate to the RF carrier strength and to the noise and interference levels; and
4. estimation of the signal to interference-and-noise ratio (SINR) from the modulation error tends to result in a high variance (unreliable) estimator.

Note that the sensitivity to frequency offset is particularly undesirable when the quality estimator is for transmitter power control. Increasing the transmitter power because a frequency offset error is mistaken for noise or interference error, is not only completely ineffective, but is undesirable because an unnecessary excess transmitter power will cause increased interference with other system users.

Thus there is a need in the art for power control methods that use a process for estimating the quality of received signal which (a) is fast; (b) is substantially insensitive to frequency offset variations; and (c) leads to a measure, for example the signal to interference-and-noise ratio (SINR), that differentiates signal from interference and noise.

SUMMARY OF THE INVENTION

Thus one object of the present invention is a method and apparatus for ongoing power control in a system that includes SDMA. Another object of the invention is a method and apparatus for estimating received signal quality (as expressed by the signal to interference and noise level (SINR)) for use in the power control method and for other applications. Another aspect of the invention is an initial power control method and application using the signal quality estimation method and/or apparatus. Yet another aspect of the invention is a method for combined initial and ongoing power control applicable to a system that includes SDMA.

In one aspect of the present invention, a method for ongoing uplink power control for communications from one or more remote users to a communication station with SDMA is disclosed that includes separating the joint determination of a spatial weight vector of weights for receiving from a particular remote user and ongoing power control from that user's transmitting into a receive weight vector determining part and a separate transmit power adjustment part. The method starts with one part, for example power adjustment wherein an initial power control strategy is used for transmitting from the remote user. Transmit power according to this initial strategy is assigned and transmission carried out. Receive weight vector assignment is now carried out for the signals transmitted to the communication station with this assigned transmit power. The resulting new weight vector is used and may affect the quality of communication. An estimate of the quality of communication is obtained for communication using the newly determined receive weight vector. Ongoing power control adjustment is applied using the estimate of the quality of communication, leading to a new power assignment for transmitting from the remote user. These new power assignments are used leading to new receive weight vector determination. Thus iterating between the transmit power setting and the spatial processing receive weight vector determining parts, receive weight vectors and power control are jointly determined.

In another aspect of the present invention, a method for ongoing downlink power control for communications to one or more remote users from a communication station with SDMA is disclosed that includes separating the determination of a complete transmit weight vector of weights for transmitting from the communication station to a particular remote user, the complete transmit weight vector comprising a set of relative transmit weights and a scaling to apply to the weights, into a relative transmit weight vector determining part and a separate transmit power adjustment part. The method starts with one part, for example power adjustment wherein an initial power control strategy is used for transmitting from the communication station to the remote user using some initial relative transmit weight vector of initial relative transmit weights. Transmit power according to this initial strategy is assigned and transmission carried out. An estimate of the quality of communication is obtained for communication using the initial transmit weight vector. Based on this, ongoing power control adjustment is applied using the estimate of the quality of communication, leading to a new power assignment for transmitting from the communication station leading to new receive weight vector determination. Separately, an updated relative transmit weight vector is determined, and such an updated relative transmit weight vector is used for transmitting. Thus the complete transmit weight vector (which includes the set of relative transmit weights and the power setting) is obtained by separately determining the power setting and the spatial processing relative transmit weight vector.

Another aspect of the invention is a method for ongoing power control for uplink communications between one or more remote transmitters (e.g., SUs) and a receiving communication station (e.g., a BS), the communication station including an array of receiving antenna elements and spatial receive processing according to a set of receive weights (a weight vector). The method includes for communicating with a particular remote transmitter setting up initial power assignment for the particular transmitter, preferably according to the method described in the Parent Patent. Starting with the initial power assignment, a set of uplink weights (i.e., a receive weight vector) is determined at the communication station for the particular remote transmitter. This weight vector is used to determine a signal from the particular remote transmitter, the determining from a plurality of signals received at the antenna elements. The received signal quality for the signals from the remote transmitters at the communication station are estimated, and based on the received signal quality estimates, new power assignments are determined for the remote transmitters. The received signal quality preferably is an estimate of the SINR. The new power assignment is applied at the remote transmitters. Preferably, the power assignment is determined at the communication station and the remote transmitters are commanded to change power by the communication station. The remote transmitters transmit with these new uplink powers, and the processes of uplink weight vector determination and power control are now repeated. Preferably, power determination is carried out at prescribed intervals.

Another aspect of the invention is a method for ongoing power control for downlink communications between a transmitting communication station (e.g., a BS), and one or more remote receivers (e.g., a SU), the communication station including an array of transmitting antenna elements and spatial transmit processing to a particular remote receiver according to a set of transmit weights (i.e., a transmit weight vector). The method includes setting up initial power assignments for the communication station, preferably according to the method described in the Parent Patent, and transmitting from the communication station using the initial power assignment and initial transmit weight vector, one weight vector for each remote receiver. In the preferred embodiment, the communication station includes a set of receive apparatuses each apparatus coupled to one of the antenna elements of the array for receiving signals, and a receive processor for spatially processing the signals received at the antenna elements from any remote transmitter according to a receive weight vector. In the preferred embodiment, each remote receiver also includes a remote transmitter for transmitting a signal, and the transmit weight vector for transmitting from the communication station to a particular remote receiver are determined from signals received at the communication station antenna array as a result of transmitting of a signal by the remote transmitter at the particular remote receiver, and in particular, the transmit weight vector is determined from the receive weight vector determined for receiving the signal transmitted by the remote transmitter at the particular remote receiver to the communication station. An estimate is determined of the quality of the signals received at each remote receiver. Preferably, the signal quality estimates are each an estimate of the SINR at each remote receiver. Preferably, each remote, receiver performs the SINR estimation and reports the received signal quality to the communication station at prescribed intervals. Based on the signal quality estimates, downlink power assignments are determined for communicating with each remote receiver. The new assignments are used by the communication station to transmit to the remote receivers. The quality estimation, power assignment and transmission are then repeated. In the preferred embodiment, the same weight vector as previously used is used if no weight vector updating has occurred, and an updated transmit weight vector is used if an updated weight vector is available.

Another aspect of the invention is a method for global ongoing power control for a communication system, which includes a set of one or more communication stations. In the system, each communication station communicates on the uplink with a set of one or more corresponding remote transmitters and on the downlink with a set of one or more corresponding remote receivers co-located with the corresponding remote transmitters. Preferably, the system is a cellular system, each communication station is a base station, and each remote transmitter and co-located remote receiver is a subscriber unit communicating with its corresponding base station. Each communication station including an array of receiving antenna elements, a set of receive apparatuses couple to the antenna array, with the outputs of the receive apparatuses coupled to a receive spatial processor, communication with a particular corresponding remote transmitter being according to a set of receive weights (i.e., a weight vector). Each communication station also includes an array of transmitting antenna elements, a set of transmit apparatuses coupled to the antenna elements and a transmit spatial processor forming a set of signals for the transmit apparatuses, communication with a particular corresponding remote receiver being according to a transmit weight vector. Power control for the overall system includes using the above method for ongoing power control for uplink communications and the above method for ongoing power control for downlink communications. The power assignment steps in both the downlink and the uplink ongoing power control methods include jointly determining all the sets of transmit powers that minimize a weighted sum of all the transmit powers for communications between the sets of corresponding remote transmitters and the communication stations (for uplink ongoing power control) and between the communication stations and the sets of corresponding remote receivers (for downlink ongoing power control) under the constraint of maintaining an acceptable level of communication for each communication link between any transmitter (in a communication station on the downlink and in a remote transmitter on the uplink) and any corresponding receiver (in a corresponding remote receiver on the downlink and in a communication station on the uplink). In one embodiment, the weighted sum of transmit powers is the sum of all transmit powers, the acceptable level of communications is a target SINR, and the target SINR is the same for all uplink communications and is the same for all downlink communications.

In another embodiment of the method for global ongoing power control, the power assignment step in the ongoing power control for uplink communications is carried out independently at each communication station and that communication station's set of corresponding remote transmitters, and the power assignment step in the ongoing power control for downlink communications is carried out independently at each communication station and that communication station's set of corresponding remote receivers.

One embodiment of the power assignment step in the ongoing power control method for uplink communications includes periodically updating the power transmitted from a remote transmitter to the communication station as a function of the target signal quality for communicating to the communication station, the powers used in previous updates for transmitting from the remote transmitter, and the estimates of the previous quality of the signal received at the communications station from the remote transmitter. The update period in the preferred embodiment is two frames. Preferably, the signal quality estimate is an SINR estimate and the target signal quality is a target SINR. In one version of the power assignment step, the function is only of the target SINR, the most recent SINR estimate, and the most recently applied power. When all power and SINR quantities are in logarithmic scale, in a particular version, the difference between the power to apply in the next update and the power applied in the most recent update is some function of the difference between the most recent SINR estimate and the target SINR, and preferably this function is proportionality. In the preferred embodiment, the target SINR is the same for all spatial channels on a conventional channel.

One embodiment of the power assignment step in the ongoing power control method for downlink communications includes periodically updating the power transmitted from the communications station to a remote receiver as a function of the target signal quality for communicating to the remote receiver, the powers used in previous updates for transmitting from the communication station to the remote receiver, and the estimates of the previous quality of the signal received at the remote receiver from the communications station. The update period in the preferred embodiment is two frames. Preferably, the signal quality estimate is an SINR estimate and the target signal quality is a target SINR. In one version of the power assignment step, the function is only of the target SINR, the most recent SINR estimate, and the most recently applied power. When all power and SINR quantities are in logarithmic scale, in a particular version, the difference between the power to apply in the next update and the power applied in the most recent update is some function of the difference between the most recent SINR estimate and the target SINR, and preferably this function is proportionality. In the preferred embodiment, the target SINR is the same for all spatial channels on a conventional channel.

In another embodiment of the uplink power assignment step, on a conventional uplink channel, the set of powers to apply for uplink communications for the spatial channels on the conventional uplink channel are those that minimize the weighted sum of the powers to transmit on the uplink spatial channels of the conventional uplink channel from the remote users to the communication station, constrained by the requirement of maintaining an acceptable (i.e., target) quality of communication on any particular uplink spatial channel of the conventional uplink channel. In a particular implementation, the minimization criterion is to minimize the total of the powers to transmit, and the constraint is that a predicted uplink signal quality measure, preferably the predicted SINR on any particular uplink spatial channel is at least some target SINR for that particular uplink spatial channel, where the predicted uplink SINR for a particular spatial channel is an expression of the particular spatial receive weight vector for the particular uplink spatial channel, the uplink path losses for the particular uplink spatial channel and for other uplink spatial channels of the conventional uplink channel, the receive spatial signature of the remote transmitter on the particular uplink spatial channel, the receive spatial signatures of the other remote transmitters on the conventional uplink channel, and the post-spatial processing noise-plus-intercell interference experienced by the communication station on the particular uplink spatial channel. In a particular embodiment, the path loss for any spatial channel is a function of the estimated SINR and of the most recently used transmit power. The intercell interference plus noise for any uplink spatial channel is determined as a function of the SINR estimate for that uplink spatial channel, the receive weight vector and the receive spatial signatures for all uplink spatial channels on the conventional uplink channel, the powers by the remote transmitters applied in the previous update of the uplink power control method for communicating on all the uplink spatial channels of the conventional uplink channel, and the path losses for the particular uplink spatial channel and for the other uplink spatial channels on the conventional uplink channel. In a particular implementation, the particular constraint for the particular uplink spatial channel, denoted by subscript i, of a total number (denoted by d) of spatial channels on a conventional channel that a predicted uplink signal quality measure, preferably the predicted SINR, is at least the value of a target signal quality, preferable a target SINR for the particular uplink spatial channel (denoted by $SINR_{target_i}^U$ can be mathematically expressed as $$\frac{L_i^U |w_i^{U*} a_i^U|^2 p_i^U}{\sum_{j \neq i, j=1}^{d} L_j^U |w_i^{U*} a_j|^2 p_j^U + I_i^U} \geq SINR_{target_i}^U$$

where, for j=1, ..., d, $P_j^U$ is the power for transmitting on uplink spatial channel j from the transmitting remote user to the communication station on uplink spatial channel j, $L_j^U$ is the path loss (which might be a gain if larger than 1) on uplink spatial channel j from the transmitting remote user to the communication on uplink spatial channel j, $w_j^U$ is the uplink (i.e. receive) weight vector (of weights) for receiving from the user on uplink spatial channel j, with the receive weight vector having a Euclidean norm of 1, $a_j^U$ is the transmit spatial signature of the remote user on uplink spatial channel j, the uplink spatial signatures each having Euclidean norm 1, and $I_j^U$ is the uplink post-spatial processing noise-plus-intercell (i.e., out-of cell) interference experienced by the communication station on uplink spatial channel j. In a particular implementation, the target SINRs are the same for all uplink spatial channels of the conventional uplink channel. The uplink minimization problem in general is to find the set of positive $p_i^U$ such that $$\sum_{i=1}^{d} c_i^U p_i^U$$

is minimized subject to the constraint of the predicted signal quality being at least the target signal quality being met on every uplink spatial channel of the conventional channel.

In yet another embodiment of embodiment of the uplink power assignment step, in a conventional uplink channel, the set of powers to apply for uplink communications for the spatial channels on any conventional uplink channel are determined by setting the predicted uplink SINR in each uplink spatial channel of the conventional uplink channel to be equal to a target SINR for that uplink spatial channel. In the preferred embodiment, the target SINR is the same for all uplink spatial channels of the conventional uplink channel.

In another embodiment of the downlink power assignment step, in a conventional downlink channel, the set of powers to apply for downlink communications for the spatial channels in the conventional downlink channel are those that minimize the weighted sum of the powers to transmit on the downlink spatial channels of the conventional downlink channel from the communication station to the remote receivers on the conventional channel, constrained by the requirement of maintaining an acceptable (target) quality of communication in any particular downlink spatial channel of the conventional downlink channel. In a particular implementation, the minimization criterion is to minimize the total of the powers to transmit on the conventional downlink channel and the constraint is that a predicted downlink signal quality measure (the measure preferable the predicted downlink SINR) for the remote receiver on any particular downlink spatial channel is at least some target signal quality, preferably a target SINR for the particular downlink spatial channel, where the predicted downlink SINR for the particular spatial channel is an expression of the particular spatial transmit weight vector in the particular downlink spatial channel, the other transmit weight vectors used for communication in the other downlink spatial channels of the conventional downlink channel, the downlink path losses for the particular downlink spatial channel and for other downlink spatial channels of the conventional downlink channel, the transmit spatial signature for transmitting to the remote receiver on the particular downlink spatial channel, and the post-spatial processing noise-plus-intercell interference experienced by the remote receiver on the particular downlink spatial channel. In the particular embodiment, the path loss for any spatial channel is a function of the estimated SINR at the remote receiver and of the most recently used transmit power. The intercell interference plus noise for any spatial channel is determined as a function of the SINR estimate for the remote receiver on the particular spatial channel, the transmit weight vectors and the transmit spatial signatures for all downlink spatial channels in the conventional downlink channel, the powers applied in the previous update of the power control method for communicating in all the downlink spatial channels of the conventional downlink channel, and the path losses for the particular downlink spatial channel and for the other downlink spatial channels in the conventional downlink channel. In a particular implementation, the particular constraint for the particular downlink spatial channel, denoted by subscript i, of a total number (denoted by d) of downlink spatial channels in a conventional downlink channel that the predicted SINR at the remote receiver on the particular downlink spatial channel is at least the value of the target SINR for the particular downlink spatial channel (denoted by $\text{SINR}_{target_i}^D$) can be mathematically expressed as $$\frac{L_i^D |w_i^{D*} a_i^D|^2 p_i^D}{\sum_{j \neq i, j=1}^{d} L_i^D |w_j^{D*} a_i|^2 p_j^D + I_i^D} \geq \text{SINR}_{target_i}^D$$

where, for j=1, ..., d, $p_j^D$ is the power for transmitting in downlink spatial channel j from the transmitting communication station to its remote receiver on downlink spatial channel j, $L_j^D$ is the path loss (which might be a gain if larger than 1) in downlink spatial channel j from the transmitting communication station to the remote receiver on downlink spatial channel j. $w_j^D$ is the downlink (i.e. transmit) weight vector (of weights) for transmitting to the user on downlink spatial channel j, with the vectors each having Euclidean norm 1, $a_j^D$ is the transmit spatial signature of the remote user on downlink spatial channel j, the downlink spatial signature having a Euclidean norm of 1, and $I_i^D$ is the downlink post-spatial processing noise-plus-intercell (i.e., out-of cell) interference experienced by the receiver on the particular downlink spatial channel i. The downlink minimization problem in general is to find the positive set of $p_i^D$ such that $$\sum_{i=1}^{d} c_i^D p_i^D$$

is minimized subject to the constraint being met on every downlink spatial channel of the conventional downlink channel.

In yet another embodiment of embodiment of the downlink power assignment step, in a conventional downlink channel, the set of powers to apply for downlink communications for the spatial channels in any conventional downlink channel are determined by setting the predicted downlink SINR in each downlink spatial channel of the conventional downlink channel to be equal to a target SINR for that downlink spatial channel. In the preferred embodiment, the target SINR is the same for all downlink spatial channels of the conventional uplink channel.

The preferred embodiments of the ongoing power control method of the present invention and of the initial power control method of the invention of the Parent Patent require an estimate of SINR of a received angle modulated signal. Another aspect of the invention is a method for determining a SINR estimate in a receiver for receiving an angle modulated signal, the method for use in a power control method for transmitting to the receiver, and for use in any other applications requiring an estimate of the quality of a received angle modulated signal. In a first implementation, the method includes estimating the mean amplitude level and the mean power level (i.e., the first and second moments of the amplitude) of the received baseband signal from measurements of the amplitude of the received signal and solving a set of simultaneous equations for the received SINR estimate.

In one particular embodiment of the first implementation, applicable for a signal modulated according to a digitally modulated scheme, the signal received in a receiver wherein the digitally modulated received signal is sampled in the receiver, the mean amplitude level and the mean power level are determined from the received baseband signal amplitude sample values, the sample values substantially at the baud points of the digital modulation scheme. In another particular embodiment of this implementation for a signal modulated according to a digital modulation scheme in a communications station having an array of antennas and a signal processor for spatial processing, wherein the digitally modulated received signal is sampled in the communication station, the mean magnitude and mean power levels are determined from the received baseband signal amplitude sample values after spatial processing, the sample values substantially at the baud points of the digital modulation scheme.

Denoting the estimate magnitude of the baseband signal as R and the estimation operation as E{ }, the set of equations is $$E[R] = \sqrt{2\sigma^2} f(\text{SINR}),$$

where $$f(\text{SINR}) = e^{-\text{SINR}} \sum_{l=0}^{\infty} \frac{\Gamma\left(\frac{3}{2} + l\right) \text{SINR}^l}{\Gamma\left(\frac{1}{2} + l\right) l!}, \text{ and}$$

$$E[R^2] = 2\sigma^2 (1 + \text{SINR}).$$

In one version, an iterative solution is used and values off f(SINR) are pre-stored in a memory. In another version, an iterative solution also is used and f(SINR) is approximated by the value 1.

In a second implementation, the method for estimating the received signal quality includes estimating the mean power level and the means square of the power level (i.e., the second and fourth moments of the amplitude) of the received baseband signal from measurements of the amplitude of the received signal, and determining the SINR from these estimates. In one particular embodiment of the second implementation, applicable for a digitally modulated signal received in a receiver wherein the digitally modulated received signal is sampled in the receiver, the mean power level (the RSSI estimate) and the mean squared power level are determined from samples of the instantaneous power (i.e., the amplitude squared) substantially at the baud points. In another particular embodiment of this implementation for a digitally modulated signal in a communications station having an array of antennas and a signal processor for spatial processing, wherein the digitally modulated received signal is sampled in the communication station, the mean power level and the mean squared power level are determined by averaging post spatial processing samples of the instantaneous power (i.e., the amplitude squared) substantially at the baud points. Denoting the RSSI (the mean power level of the received signal, post spatial processing in the case of SDMA) by $\overline{R^2}$, and the mean squared power by $\overline{R^4}$, the SINR is determined using $$\mathrm{SINR} = \frac{\sqrt{A}}{1-\sqrt{A}} = \frac{A+\sqrt{A}}{1-A}, \text{ where } A = 2 - \frac{\overline{R}^4}{(\overline{R^2})^2}.$$

In the preferred embodiment of both the first and second implementation, the SINR estimate of a received signal is determined over a single time period, preferably over a frame in the case of a PHS system. In an improved embodiment applicable to both the first and second implementation, the SINR value is determined as a running average of the SINR estimate in the current time period with SINR values determined in previous time periods.

Other aspects of the invention will be apparent to those of ordinary skill in the art from the following detailed description.

BRIEF DESCRIPTION OF THE DRAWINGS

FIG. 7(a) is applicable on the uplink and FIG. 7(b) is applicable on the downlink;

FIG. 8(a) is applicable on the uplink and FIG. 8(b) is applicable on the downlink;

DETAILED DESCRIPTION OF THE INVENTION

System Architecture

Figure 1:
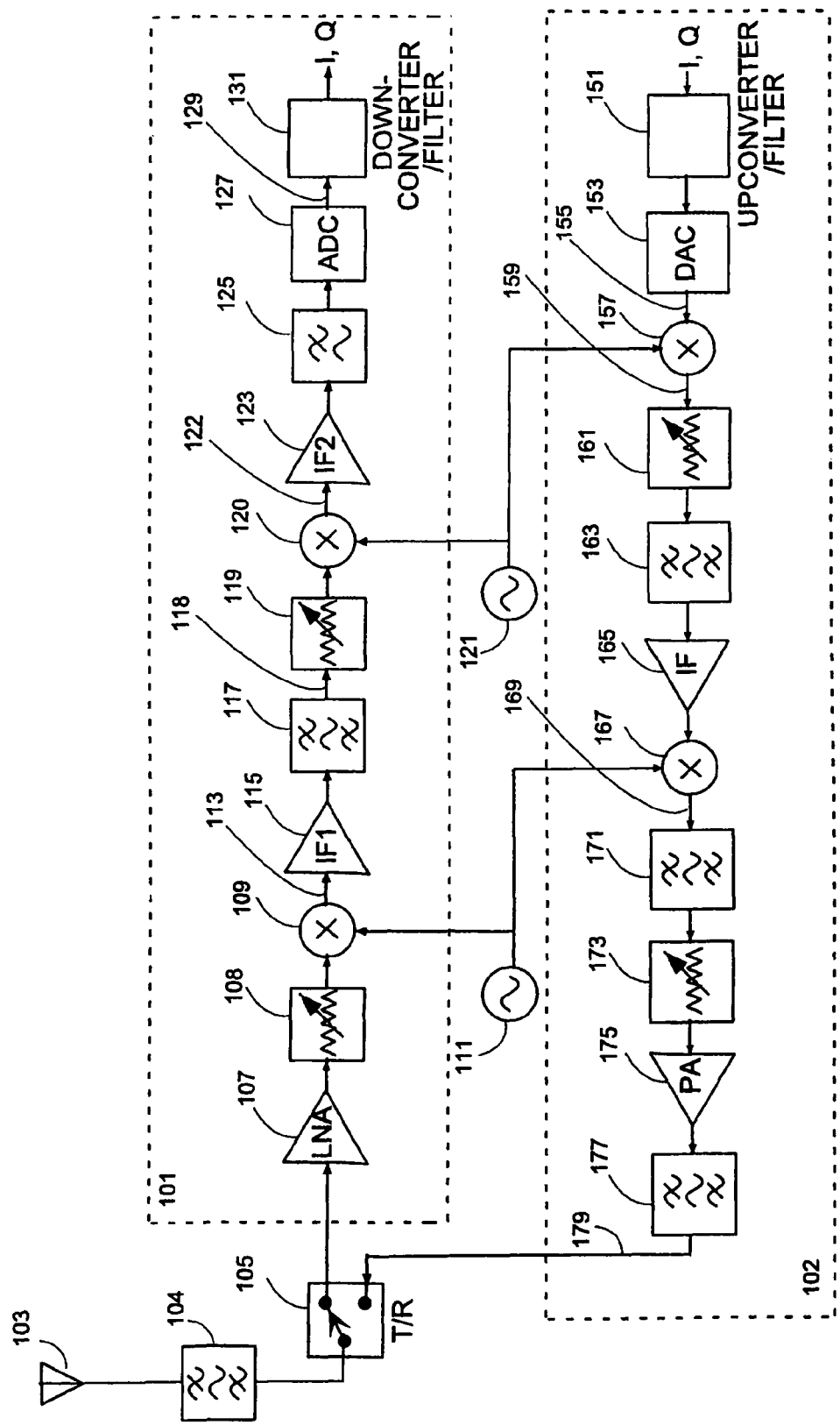
FIG. 1 is a block diagram of a transceiver (receiver and transmitter) module of the base station incorporating some aspects of the present invention. The transceiver module extracts I, Q baseband signals from received RF signals for further processing in the modem module (FIG. 2), and accepts I, Q baseband signals from one or more modem modules for RF transmission.

The methods of the invention may be implemented on any communication system which includes one or more communication stations and one or more remote receivers (for communication on the downlink) and transmitters (for communication on the uplink). The only requirement for the quality estimation aspects of the invention is that the modulation used includes some form of angle (e.g., phase) demodulation, and the only requirement for the downlink SDMA power control is the ability to determine downlink transmit weights, for example from received uplink signals. The methods of the invention preferably are implemented on a communication station which is a base station and on its subscriber units, which are part of a communication system in which a base station uses SDMA to communicate with its subscriber units. In the preferred embodiment, the communication system is meant for use in a wireless local loop (WLL) cellular system. While the subscriber units in the illustrative embodiment are fixed in location, in other systems, they may be mobile.

The SDMA base station first is described.

Base Station Architecture

A multi-element antenna array is used in the base station in order to provide spatial processing. The number of antennas in the array is variable. The downlink chain of the base station includes a processor for spatially processing coupled to a set of antenna transmit apparatuses, each coupled to one of the antenna elements. The uplink chain of the base station includes a set of antenna receive apparatuses each receiving a signal from one of the antenna elements, with the antenna receive apparatuses coupled to a processor for spatially processing the received signals. In the illustrative embodiment, communication between base stations and subscriber units uses the standard known as "Personal Handyphone System" (PHS), ARIB Standard, Version 2 (RCR STD-28). The PHS system is an 8-slot TDMA/FDMA system with true time division duplex (TDD). Each frequency channel ("subcarrier") has an approximate bandwidth of 300 kHz. The 8 timeslots are divided into 4 transmit (TX) timeslots and 4 receive (RX) timeslots. This implies that for any particular channel, the receive frequency is the same as the transmit frequency. It also implies reciprocity; i.e., the radio propagation path for both the downlink (from base station to users' remote terminals) and the uplink (from users' remote terminals to base station) is identical, assuming minimum motion of the subscriber unit between receive timeslots and transmit timeslots. The frequency band of the PHS system used in the preferred embodiment is approximately 1895 to 1920 MHz. Each of the 8 timeslots is 625 microseconds long. The PHS system has a dedicated frequency and timeslot for a control channel on which call initialization takes place. Once a link is established, the call is handed to a service channel for regular communications. Communication occurs in any channel at the rate of 32 kbits per second (kbps), called full rate. Less than full rate communication is also possible.

In PHS as used in the preferred embodiment, a burst is defined as the finite duration RF signal that is transmitted or received over the air during a single timeslot. A group is defined as one set of 4 TX and 4 RX timeslots. A group always begins with the first TX timeslot, and its time duration is 8×0.625=5 msec.

The PHS system uses π/4 differential quaternary phase shift keying (π/4 DQPSK) modulation for the baseband signal. The baud rate is 192 kbaud. That is, there are 192,000 symbols per second.

Receiver Part of the Transceiver Module in the Base Station

The base station uses an antenna array of antenna elements, and for each antenna, a transmit/receive (T/R) switch, an analog receiver, a digital receiver, a digital transmitter, and an analog transmitter. Thus this module includes part of the antenna transmit apparatuses and part of the set of antenna receive apparatuses. The analog and digital receiver and transmitter for any antenna element are implemented in a single RF TX/RX transceiver module, so that each module implements a one antenna 16 carrier wide band radio spanning 10 MHz of spectrum. The architecture is fairly standard, and several variations are possible, as would be clear to those of ordinary skill in the art. The particular architecture used for the receiver part of a transceiver module is shown in FIG. 1. The RF signal is received at antenna element 103, and passes via a band pass filter (BPF) 104, implemented as a cavity filter with a 1895 to 1920 MHz band pass. Antenna 103 and filter 104 are external to the transceiver module. The signal from filter 104 goes to a transmit/receive (T/R) switch 105 on the transceiver module. From switch 105, the signal passes to a low noise amplifier (LNA) 107, one or more stages of band pass filtering (not shown) and a variable attenuator 108 to a first downconverter 109, the downconverter using a tunable mixer using a local oscillator 111 (not part of the module) of approximately 1.6328 GHz to produce a first IF signal 113 at 275-285 MHz (10 MHz bandwidth). This first IF signal 113 is amplified in a first IF amplifier 115 and then passes through a SAW BPF filter 117 (275-285 MHz) that suppress "adjacent channels" and the byproducts of the first downconverter. The resulting signal 118 passes through a second variable attenuator 119 to a second downconverter 120 using a mixer with a tunable mixer frequency of 291 MHz from a local oscillator 121. The output of the second downconverter 120 is a second IF signal 122 at −(6-16) MHz IF frequency with a 10 MHz bandwidth and a center frequency of −11 MHz. This second IF signal 122 is amplified in a second IF amplifier 123 and a low pass filter (LPF) 125 to an analog to digital converter (ADC) 127 which samples the signal at 36.864 MHz. Only the real part of the signal is sampled: Thus signal 129, the output of ADC 127, contains the complex values IF signal centered at −11 MHz together with an image at +11 MHz, and sampling produces also an image at 25.864 MHz. This signal now passes through a digital downconverter/filter device 131 implemented with an Analog Devices, Inc. (Norwood, Mass.) AD6620 Dual Channel Decimating Receiver. In alternate implementations, a similar device, a Graychip, Inc. (Palo Alto, Calif.) GC1011 may be used, or the functionality may be otherwise provided for. Digital downconverter/filter device 131 performs several functions:

- multiplying the signal by a complex phasor at a selected one of any of the center frequencies of each of the carriers;
- digital bandpass filtering with a desired bandpass of 300 kHz, currently implemented as an approximately 450 kHz bandpass filter, centered at any of the center frequencies of each of the carriers. This gives a complex valued (in phase I part and quadrature Q part) baseband signal three-times baud-rate oversampled, that is, sampled 192 kHz*3=576 ksamples/sec.

The above described receiver is built on an RX/TX board, and each such RX/TX board handles 16 received carriers, each carrier having its own AD6620 digital downconverter/filter device. Each AD6620 device thus generates 16 bits of I data and 16 bits of Q data, each at 576 ksamples/sec. The data is clocked out of each AD6620 device in series at 18.432 MHz. This data goes to the modem board.

The Modem Module in the Base Station

Figure 2:
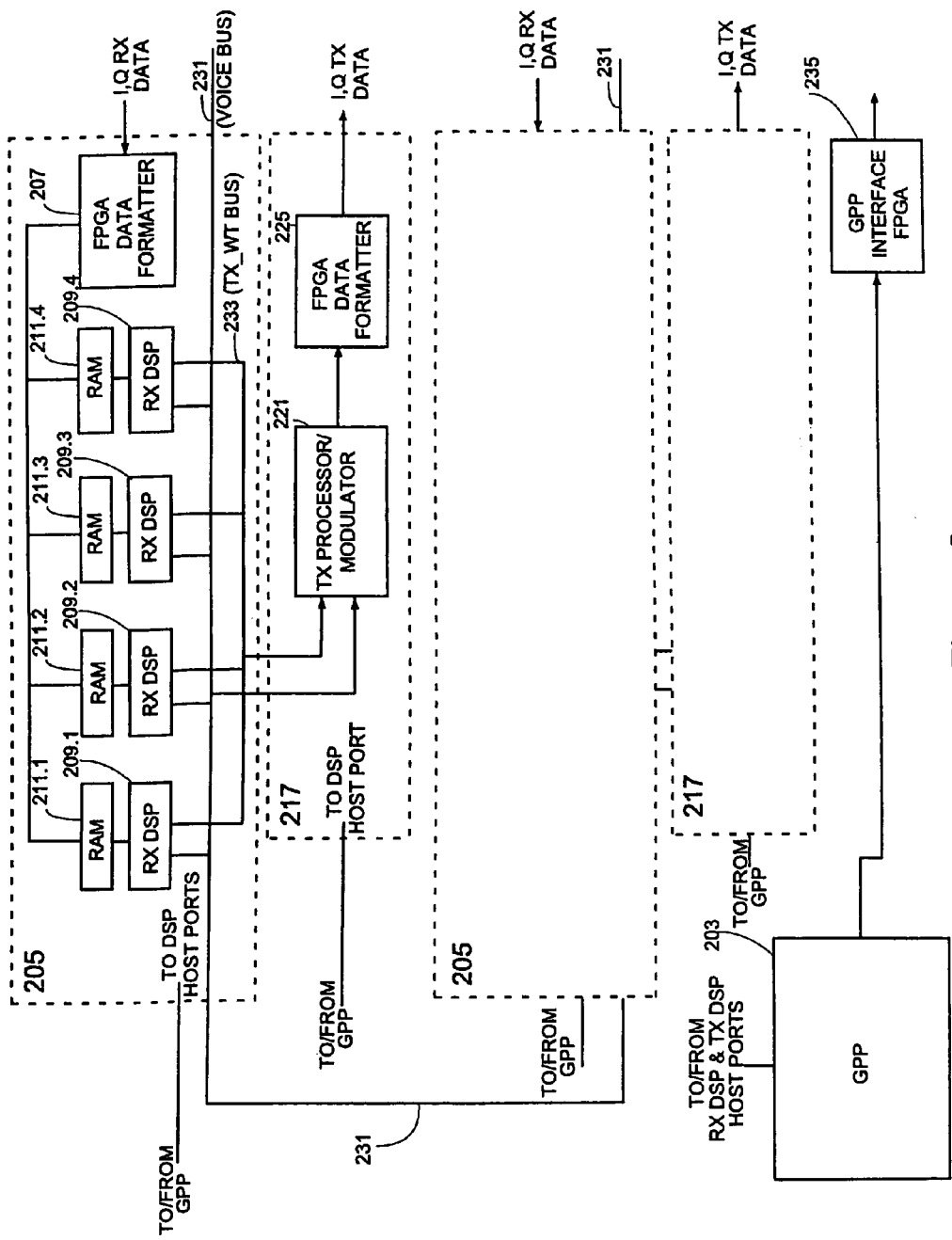
FIG. 2 is a block diagram of the modem module of the base station incorporating some aspects of the present invention. The modem module accepts I, Q baseband signals from one or more transceiver modules and processes such signals, such processing including determining signal quality and implementing power control according to various aspects of the invention.

A block diagram of a modem board is shown in FIG. 2. Each modem board includes a single general purpose processor (GPP) 203 (a Motorola/IBM PowerPC device) controlling two RX blocks and two TX blocks, each RX block 205 including a RX data formatter 207, four RX digital signal processor devices (DSPs), denoted 209.1, 209.2, 209.3, and 209.4, respectively, and four RX DSP memories denoted 211.1, 211.2, 211.3, and 211.4, respectively, which are connected to the four RX DSPs. There is one RX DSP and one associated RX DSP memory for each receive timeslot. Each TX block 217 includes a TX processor modulator block 221, and a TX data formatter 225 (implemented using a FPGA). Each RX and TX block pair can handle the receive spatial processing, demodulation, modulation, and transmit spatial processing for one carrier in a twelve antenna system, or for two carriers in a six antenna system, or three carriers in a four antenna system. Thus one modem board can handle the necessary processing for two carriers in a twelve-antenna system, or for four carriers in a six-antenna system, or six carriers with a four-antenna system.

A single RX block 205 of a modem board is now described. The series I, Q data from the receive part of the transceiver of each antenna is passed to a data formatter 207 implemented as a field programmable field array (FPGA), which converts the serial stream to parallel data which is deposited via direct memory access to one of the four RX DSP memories 211.1-211.4, the data for each of the four receive timeslots going to one RX DSP memory to be processed by the associated RX DSP (209.1-209.4). The RX DSPs 209.1-209.4 are each a Motorola M56303 digital signal processor. Each RX DSP performs several functions, including:

- spatial processing, including determining weights;
- frequency offset correction;
- equalization;
- demodulation; and
- in one embodiment of the present invention, signal quality estimation.

The demodulated signals output from each timeslot RX DSP 209.1-209.4 go to a signal bus, called the voice bus 231, except for certain control signals that go to the GPP 203 via a host port interface. The signal quality estimates determined in RX-DSPs, the SINR data sent by a remote user, and some status information also are sent to GPP 203. The spatial processing weights determined by each RX DSP go to TX processor/modulator block 221 in transmit block 217 via a transmit weight (TX_Wt) bus 233. Transmit power adjustments as part of power control are carried out by adjusting the transmit weights.

The functions performed by general-purpose processor (GPP) 203 include:

- Receiving signal quality and status data from the RX DSPs;
- In one embodiment of the present invention, using data from the RX DSPs to determine power control; and
- Generating all the control signals and setting all the RX DSP and TX processor/modulator block modes and performing other higher level functions and protocols, including communicating with other processors in other parts of the system via an interface FPGA 235.

Transmit block 217 operates as follows. TX processor/modulator 221 accepts voice data from voice bus 231, SACCH and FACCH data from GPP 203 and transmit weights for spatial processing from TX_Wt bus 233. The functions of TX processor/modulator 221 include burst building, encryption, scrambling, CRC for each of the users being spatially multiplexed in each of the four timeslots, modulating, and applying complete transmit weights (including the amplitude as power control) for each burst just as the burst starts. Transmit block 217 can handle four total spatial channels. The modulation is π/4 DQPSK, and 2* oversampled I and Q data is generated (2*192 ksamples/sec=384 ksamples/sec). The transmit weight applying part carries out the complex transmit weight calculation for up to 12 transmitting antennas (i.e., a twelve element antenna array), and for up to four spatial channels. This results in up to 12 digital signals, each having an I & Q component. The outputs of TX processor/modulator 221 are serialized into up to twelve different serial data streams (I followed by Q) for each of the up to twelve antennas, each I, Q pair going to one RX/TX transceiver module. In one implementation, TX processor/modulator 221 includes a DSP device, memory and a FPGA.

Transmit Part of the Transceiver Module in the Base Station

The transmit part of the transceiver module is now described with the aid of FIG. 1. Like the receiver, the transmit part can handle 16 carriers of 300 kHz bandwidth for a total bandwidth of 10 MHz. The incoming 2* upsampled baseband signal from each carrier goes to one of four Graychip, Inc. GC4114 quad digital upconverter/filter devices, each device handling four carriers, for a total of four GC4114 devices on one transceiver module. One channel of one GC4114 device is shown in FIG. 1 as digital upconverter/filter 151. It performs upconversion (interpolation) of the I, Q data into a single digital signal sampled at 49.152 MHz (=2*24.576 MHz), as well as adding to the present signal the signal (carriers) from another GC4114 channel in a cascade manner, so that the final output will be a single real valued 49.152 MHz digital signal of samples of a 10 MHz total bandwidth signal. This signal is fed to a 14 bit digital to analog converter (DAC) 153 to generate an analog baseband signal 155 with 10 MHz bandwidth at center frequency −11 MHz. Signal 155 is now fed into an upconverter 157 using a mixer with a tunable mixer frequency of 291 MHz from a local oscillator 121 to produce IF signal 159 at 275-285 MHz (10 MHz bandwidth). In the illustrative embodiment, local oscillator 121 is external to the transceiver module. Signal 159 now passes through a digitally variable attenuator 161 and then passes through an IF strip comprising two SAW filters and two IF amplifiers, shown for simplicity in FIG. 1 as a single BPF filter 163 and single IF amplifier 165. The filtered and amplified IF signal goes through upconverter 167, the upconverter comprising a tunable mixer using a local oscillator 111 (external to the module) of approximately 1.6 GHz to produce the approximately 1900 MHz RF signal 169. RF signal 169 goes through BPF 171 and then a digitally variable attenuator 173. This signal passes through a power amplifier (PA), a BPF and a second PA, then through a LPF. For simplicity, this combination of PAs and filters is shown in FIG. 1 as a single power amplifier 175 and a single BPF 177 to produce the signal 179 that goes to T/R switch 105. The signal from switch 105 goes to the antenna element 103 as described for the receive part.

The Subscriber Unit

Figure 9:
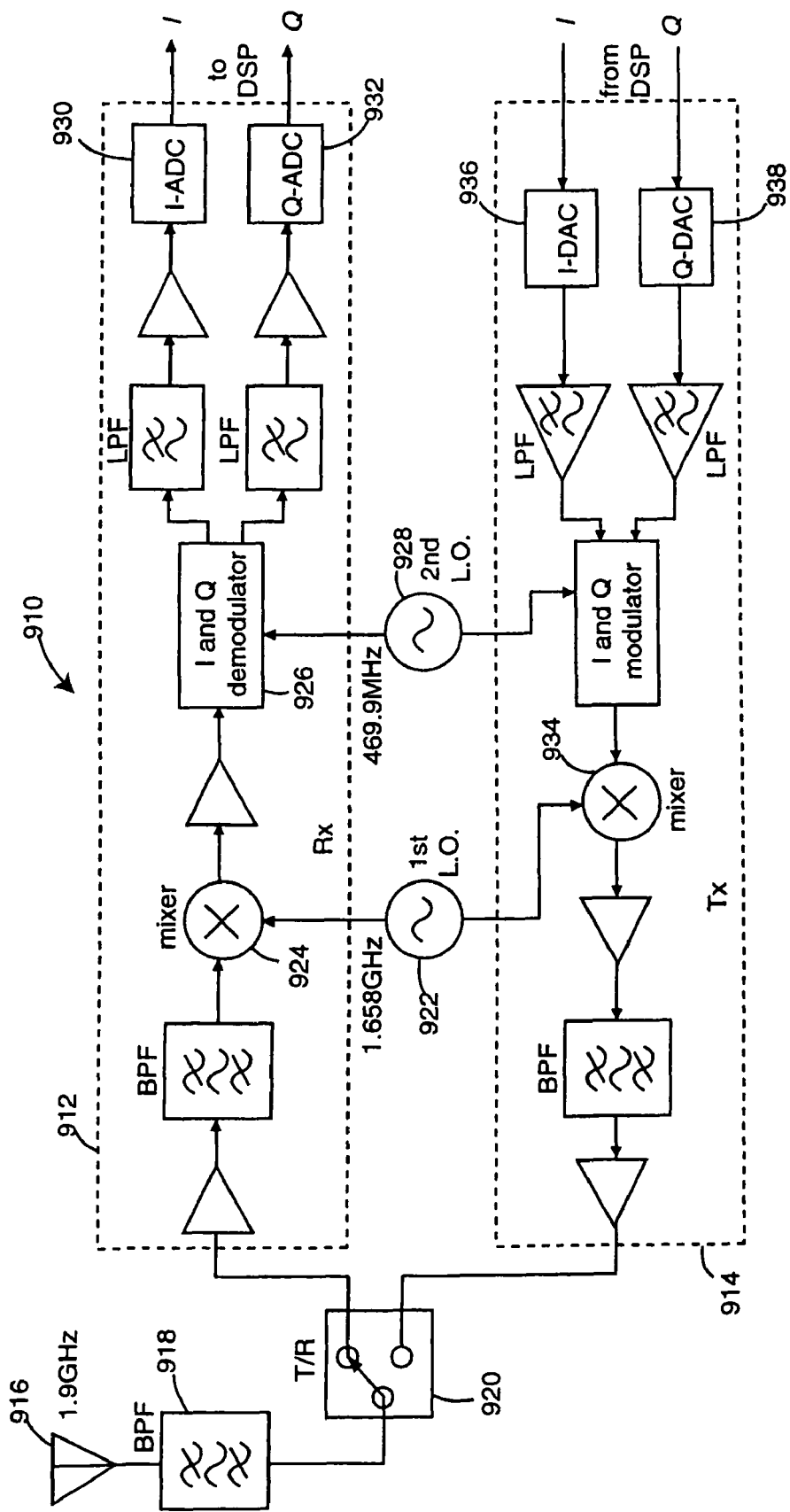
FIG. 9 illustrates the RF sections of the wireless telephone subscriber unit (SU) with which the SU parts of the invention preferably are implemented.

FIG. 9 illustrates the RF sections of the wireless telephone subscriber unit (SU) with which the SU parts of the invention preferably are implemented, these RF sections referred to herein by the general reference numeral 910. RF sections 910 include a receiver front end 912 and a transmitter final stage 914 each connected to an antenna 916 through a bandpass filter 918 and a transmit/receive (T/R) switch 920.

The received signals go through a typical downconversion using a 1658 MHz first local oscillator 922 connected to a first intermediate frequency (IF) mixer 924 that produces an IF of 248.45 MHz. The in-phase (I) and quadrature (Q) signals are separated by an I, Q demodulator 926 connected to a second local oscillator 928 operating at 469.9 MHz.

A typical local oscillator is crystal controlled and will have an accuracy of about±10 parts per million (ppm), or±20 kHz at the 1.9 GHz RF carrier frequency. The local oscillators in the present invention are preferably of the phase locked loop (PLL) type so that the initial crystal frequency errors can be largely mitigated out by adjusting a voltage controlled oscillator (VCO) once the control channel is acquired. In PHS, a 20 kHz error translates to a phase error of 37.5 degrees over the duration of one symbol period. It is common to use decision-directed carrier recovery in demodulating DQPSK signals as used in PHS. If noise is present, a decision-directed carrier recovery method will likely break lock, unless an initial coarse frequency correction is applied. In the particular p/4 QPSK demodulation used in the PHS embodiment, when the frequency offset phase error reaches 45 degrees over the symbol period duration, the decision direction frequency offset estimation will break lock completely, and the bit error rate (BER) will skyrocket.

An in-phase analog-to-digital converter (I-ADC) 30 produces 8-bit I-samples at a rate of 768 kilosamples/second. A quadrature phase analog-to-digital converter (Q-ADC) 32 similarly produces 8-bit Q-samples at the same rate of 768 kilosamples/second.

The transmitted signals go through a typical up-conversion using the 1658 MHz local oscillator 922 connected to a final radio frequency (RF) mixer 934. The in-phase (I) and quadrature (Q) signals to be transmitted are received as a stream of 8-bit I-samples at a rate of 768 kilosamples/second by an in-phase digital-to-analog converter (I-DAC) 936, and as a stream of 8-bit Q-samples at the rate of 768 kilosamples/second by a quadrature phase digital-to-analog converter (Q-DAC) 938.

Figure 10:
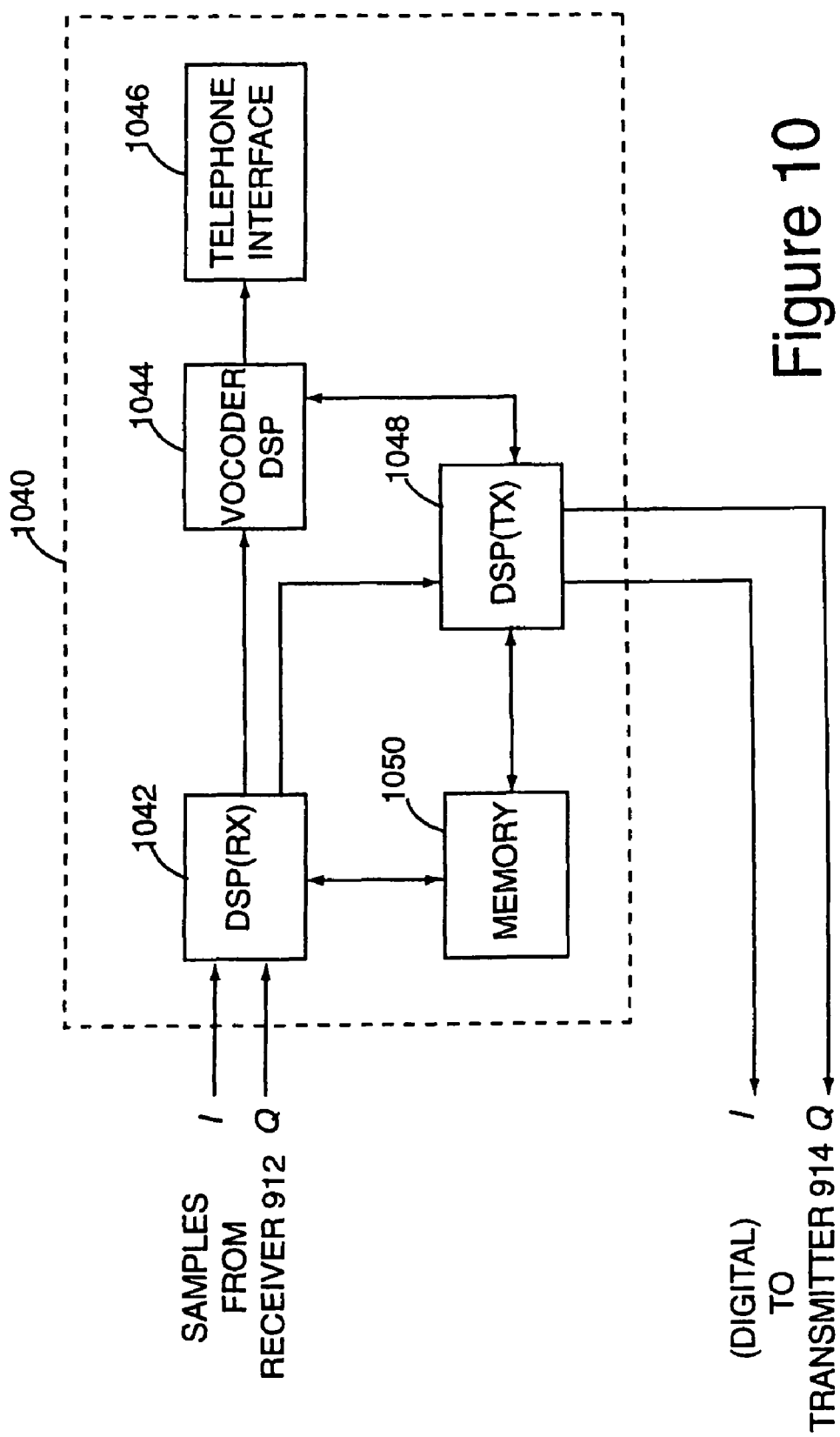
FIG. 10 is a block diagram of the digital signal processor (DSP) section of the SU with which the SU parts of the invention preferably are implemented.

FIG. 10 is a block diagram of a digital signal processor (DSP) section 1040 that receives the I/Q-samples from the receiver front end 912 and that produces the I/Q-signals to be sent out by the transmitter final stage 914. The DSP section 1040 includes several DSP devices, including a receiver-DSP (DSP(RX)) 1042 that is connected to a voice encoding DSP device (vocoder) DSP 1044 and a telephony interface 1046. A transmitter-DSP (DSP(TX)) 1048 receives voice/data from the interface 1046 and encodes them into the proper I/Q-signals for transmission by the transmitter final stage 914. A fast memory 1050 supplies program execution and support memory for the DSP(RX) 1042 and DSP(TX) 1048. A Motorola (Phoenix, Ariz.) DSP56303 24-bit digital signal processor is used for each of the DSP(RX) 1042 and DSP (TX) 1048. The DSP56303 is a member of the DSP56300 core family of programmable CMOS DSPs. Other DSP devices or microprocessors may be substituted, as would be clear to one of ordinary skill in the art.

Referring to FIG. 9, RF signals with carriers at approximately 1900 MHz are used to produce in-phase ("I") and quadrature ("Q") components that are detected using a 469.9 MHz carrier. The I and Q signals are digitized and sampled at four times the symbol rate. For the PHS system used in the illustrative embodiment the symbol rate is 192 kHz, so the sampling rate in this example would be 768 kilosamples/sec. Each sample is 8-bits deep.

In FIG. 10, the received digital I and Q signals are digital-signal processed by the DSP(RX) 1042. The DSP(RX) 1042 is preferably programmed to:
1. collect I and Q samples from the ADCs 1030 and 1032;
2. do the control-channel acquisition and processing fundamental to time-division duplexing, do the initial estimation of channel-control-data burst timing, and do the initial carrier frequency offset determination;
3. do unpacking, frequency offset compensation, down-conversion, filtering and equalization, wherein a block of four-times oversampled raw baseband samples corresponds to a block of one-time oversampled (192 kHz) signals that are equalized and baud aligned for demodulation. Time alignment to establish the approximate baud points is carried out as described in co-owned U.S. patent application Ser. No. 08/907,594 (filed Aug. 8, 1997) entitled METHOD AND SYSTEM FOR RAPID INITIAL CONTROL SIGNAL DETECTION IN A WIRELESS COMMUNICATION SYSTEM, Yun, inventor. The baud aligned I and Q samples determined by DSP(RX) 1042 are used by DSP(RX) 1042 for estimation of the SU received signal quality (the SU received signal to interference-plus-noise ratio) in one aspect of the present invention;
4. carry out demodulation;
5. disassemble the demodulated burst signals;
6. descramble the messages;
7. do cyclic redundancy checks (CRC);
8. decrypt the traffic data;
9. send the voice traffic data to the vocoder DSP 1044;
10. send the control channel signals and channel-quality measurements to the DSP(TX) 1048;
11. update the receive compensation filter and frequency offset estimates;
12. in the case of SDMA, compute the calibration information to be sent back to a base station (see, for example, Our Calibration Patent); and
13. update voltage control oscillators (VCOs) and phase lock loop (PLL) (not shown) used in the RF receiver and transmitter part.

Thus the SU embodiments of quality estimation aspects of the present invention are carried out in DSP(RX) 1042.

The power for transmitting to the BS as determined according to aspects of the present invention is adjusted using SDP (TX) 1048.

It would be clear to those in the art that the particular receiver, transmitter, and signal processing described herein for the base station and/or for the subscriber unit is only one possible structure, and many variations are possible without deviating from the invention. For example, in the base station, the final downconversion, or upconversion need not be carried out digitally. Similarly, the particular DSP structure may be substituted by microprocessors or other general-purpose processors, or by dedicated hardware. Similarly, many other communication protocols may be used in place of the PHS. Finally, the invention is not restricted to TDMA/FDMA systems.

Initial Power Control

In one aspect of the invention is a power control method that establishes the radiated RF power level in a communication system by adaptively controlling the transmitter power levels based on trial RF transmissions. The communication system used in the preferred embodiment is an SDMA system meant for use in a wireless local loop (WLL) cellular system. One or more base stations are used, each base station (BS), also called a cell station (CS), communicating with one or more subscriber units (SUs), a SU also called a remote terminal or personal station (SU). Each BS includes a multi-element antenna array in order to provide spatial processing.

In a standard PHS protocol, the control sequence for setting-up and establishing an incoming call to a SU from the BS is shown in Table 1.

TABLE 1

PHS Call Establishment Protocol 1. the BS, desiring a connection with a particular SU, sends a paging signal to the selected SU on a control channel of the selected PS, called the paging channel (PCH);
2. the selected SU responds by sending a link channel establishment request to the BS on a control channel called the signaling control channel (SCCH);
3. the BS responds to the link channel establishment request from the SU by selecting a traffic channel (TCH) and sending to the SU on the SCCH information about the selected TCH, the TCH in this case called the link channel (LCH);
4. the selected SU switches to the assigned LCH and transmits a sequence of synchronization (SYNCH) burst signals followed by a sequence of idle traffic bursts; and
5. upon successful detection of a synchronization signal (SYNCH burst) from the SU, the BS responds by transmitting a sequence of SYNCH bursts on the LCH followed by a sequence of idle traffic bursts, and then proceeds to establish a connection with the incoming call to the BS, invoking any additional signaling that may be required (e.g., encryption and user authentication).

The PCH is a one-way downlink point-to-multipoint channel on which the BS transmits identical information to all SUs in the paging area. The SCCH is a bi-directional point-to-point channel that transmits information needed for call connection between the BS and a SU. The TCH is a point-to-point bi-directional channel for transmitting user (subscriber) information.

It is in general desirable, and it is sometimes government policy that the minimal transmitter power levels adequate for each connection be used in order to reduce interference between stations using a common frequency band. The link establishment procedure of Table 1 does not include any power control, for example to ensure the use of minimal transmitter power levels adequate for each connection, and does not address the impact on existing subscribers of interference that would result from the new connection. Such power control is especially critical when bringing up a spatial channel call on a conventional channel already occupied by an existing user.

To satisfy the minimal transmitted power requirement, one embodiment of the power control method of the present invention includes having the SU introduce a set of trial SU transmitter power levels in step 4 of the protocol of Table 1. The initial power level used by the SU to transmit a synchronization (SYNCH) burst in step 4 is set at a prescribed safe low level that generally would not be sufficient for acceptable quality reception by the BS. Thus, the absence of a SYNCH burst reply (step 5, Table 13) indicates to the SU that a SYNCH burst was not received at the BS with acceptable quality, and thus that its SYNCH burst transmission power level was too low. The SU then increases the power level and retransmits a SYNCH burst, and so retransmits each time no SYNCH burst is received from the BS as would be expected in step 5. When the BS finally receives a SYNCH burst from the SU at an acceptable quality, it transmits a SYNCH burst to the SU, so that when a BS-transmitted SYNCH burst finally is received at the SU, the minimal transmitted power level sufficient for communications is being used by the SU. Also, by standardizing (a) the initial SU transmitter power level used for transmitting the SYNCH burst, and (b) the incremental increases for each SU retransmission, for example, +3 dB), the SU transmitter power level required is determined at the BS from the number of +3 dB power increments that were made in the elapsed time between the link channel assignment (step 3, Table 1) and when the SU transmitted SYNCH burst was received at a sufficient quality at the BS. This also can be used to set the BS transmitted power level. The PHS system is a time-division-duplex (TDD) system, so there is substantially reciprocity of transmit and receive propagation paths. Thus the BS can use the SU transmitter power level to determine the minimum transmitter power level to be used by the BS for communicating with the SU (i.e., after taking into consideration any differences in SU and BS receiver sensitivity). For non-TDD systems, the difference in transmit and receive propagation paths may be accounted for by performing on-air measurements and calibrating.

When a connection request originates with a SU, the connection protocol is the same as that of Table 1, but excluding step 1 of paging from the BS. Thus, modification for including power control to set minimal transmitting power is the same as described above.

The advantage of the above described method of power control is that it may be applied to an existing communication system without adversely impacting communication system protocols that are in existence.

Two embodiments of the method involve two ways of determining at the BS whether the received signal quality is acceptable. In the first embodiment, a measure of received signal quality is used at the BS to determine successful reception of the SYNCH burst. The second embodiment includes recognizing that part of a SYNCH burst that is unique to such a burst. In PHS as used in the preferred embodiment, a SYNCH burst is 224-bit long and includes a 62-bit preamble and a 32-bit "Unique Word" sequence, both of which are prearranged, as well as a BS identification code and a SU identification code. Thus, the BS may determine successful reception by correctly recognizing a SYNCH burst. This can be done in addition to, or instead of using a measure of signal quality.

Table 2 shows the specification of a standard 224-bit duration SYNCH burst as used in the preferred embodiment for uplink (SU to BS) or downlink (BS to SU) synchronization. Each of the patterns is shown in order.

TABLE 2

| Name | Length | Description |
| --- | --- | --- |
| R | 4 bits | any 4 bit pattern |
| SS | 2 bits | fixed field 10 |
| PR | 62 bits | a fixed periodic preamble for both uplink and down link 0110011001100110 . . . 011001 |
| UW | 32 bits | Unique Word, which for designating uplink synchronization is 01101011100010011001101011110000 and for downlink synchronization is 01010000111011110010100110010011; |
| CI | 4 bits | fixed field 1001 |
| CSID | 42 bits | BS identification code |
| PSID | 28 bits | SU identification code |
| IDL | 34 bits | all zeros, idle bits 0 . . . 00 |
| CRC | 16 bits | cyclic redundancy code error detection. |

Those of ordinary skill in the art will understand that other synchronization signals may be used.

Figure 3:
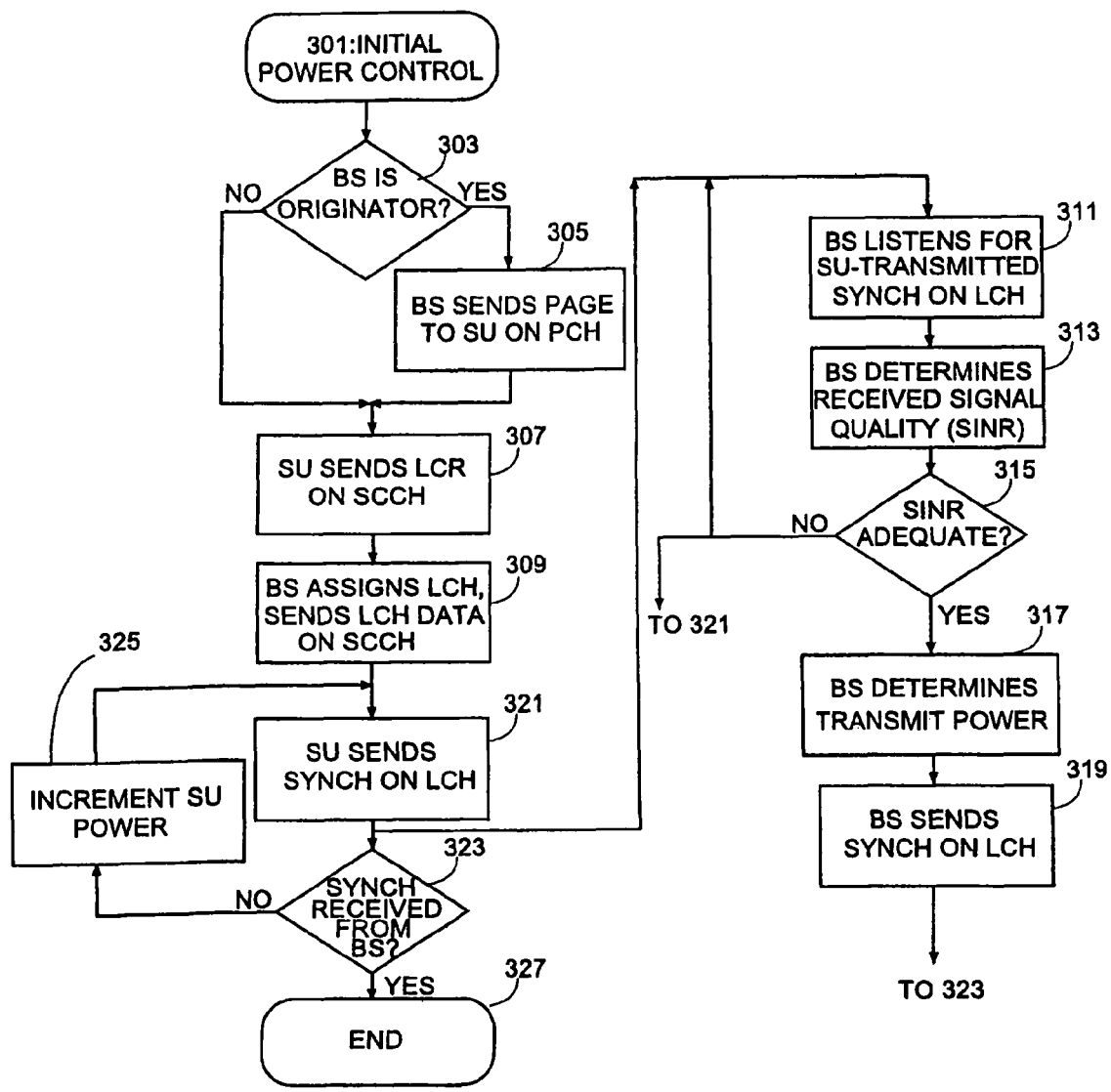
FIG. 3 is a flow diagram of one embodiment of a method for call establishment using minimal transmitted power for a PHS system.

FIG. 3 is a flow chart that summarizes a preferred embodiment initial power control method 301 for adaptively determining the adequate power level for acceptable communications. The method of the flow chart of FIG. 3 is designed to be compatible with the connection protocol for PHS, and does not require any modification to the PHS standard other than simple additions that provide downward compatibility.

Referring to FIG. 3, the method of flow chart 301 for adaptive power control is presented in two versions depending on whether or not the BS is an originator of a connection request. This is shown by decision 303, which checks if the BS is the originator. If so, the method starts with step 305 in which the BS pages the selected SU on PCH and then moves to step 307. If the BS is not the originator, the method starts at step 307. In the remainder of the description of the flow chart 301, it will be understood that "selected SU" means the SU paged by the BS in the case of the BS initiating the connection, and the initiating SU in the case of a SU initiating the connection. In step 307, the selected SU sends a link channel establishment request (LCR) message to the BS on SCCH in response to the page (or, when SU originates, the originating SU sends a LCR message to the BS on SCCH). The BS selects the best candidate link channel (LCH) from the set of traffic channels available and transmit the selection to the SU on SCCH as a tentatively assigned LCH in step 309. See co-owned U.S. patent application Ser. No. 08/777,598 (filed Dec. 31, 1996) entitled CHANNEL ASSIGNMENT AND CALL ADMISSION CONTROL FOR SPATIAL DIVISION MULTIPLE ACCESS COMMUNICATION SYSTEMS, Yun and Ottersten, inventors, for details. At this juncture, the selected SU, at step 321 sends a SYNCH burst on the tentatively assigned LCH at a prescribed low power level that is approximately at the lowest possible power level at which acceptable quality reception by the BS might be expected. At step 323, the selected SU checks if a SYNCH burst has been returned by the BS indicating that last SYNCH burst sent by the SU was received at the BS and the BS transmitted a SYNCH burst in response, this in turn indicating that the SU transmitted with sufficient power to establish acceptable quality reception at the BS. If at step 323 a BS sent SYNCH burst was not received, the SU increments the transmitter power level by a prescribed amount (typically +3 dB) in step 325 and returns to step 321 to again transmit a SYNCH burst. The 3 dB power increments ensure that the power level established in step 325 will be within 3 dB of the minimum power required for quality reception. Finer increments would allow the established power level to be as close as desired to the minimum power level (e.g., +1 dB increments would ensure that the established power level is within 26% of the minimum). Meanwhile, at the BS, in step 311, the BS listens on the tentative LCH for the SU originated SYNCH burst transmission, and in step 313 computes the received signal quality as a signal-to-interference-plus-noise-ratio (SINR). In lieu of the SINR, one can check if the burst is correct, since all the SYNCH burst bits are known a priori. In test step 315 the BS determines if the SYNCH burst is received with acceptable quality. If not, the BS waits for the next SYNCH burst from the SU. After receiving a SYNCH burst with an acceptable SINR as determined by test step 315, the BS computes (in step 317) the BS transmitting power level, the determination based on the time elapsed between the BS LCH assignment in step 309 and the receipt of an acceptable quality SYNCH burst in step 315. Because the repeated transmissions of the SU SYNCH burst occur at prescribed intervals, 5 ms in the preferred embodiment, the power used by the SU transmitter for the received SYNCH burst may be determined, and for the +3 dB increments of the preferred embodiment, is $2^{M-}P_0$ where M is the number of power increments and $P_0$ is the prescribed initial SU transmitter power in linear scale (e.g., in Watts). At step 319, the BS transmits a SYNCH burst using a power level based on the computations of step 317. In step 323, the selected SU, upon receiving the BS SYNCH burst, recognizes that the last power level used is adequate for establishing a connection and the process ends.

Because the PHS SYNCH burst is a long bit string, the successful reception of the SYNCH burst can be used as an optional indication that the received signal quality is acceptable and that the transmitter power level used by the SU to transmit the received SYNCH burst is adequate. If this option is selected, the computation of the received uplink SINR in step 313 of FIG. 3 may be omitted and the test in step 315 is answered affirmatively if the SYNCH burst bit pattern is correctly received.

It should be recognized that for the purpose of clarity in describing the method shown in FIG. 3, specific characteristics of the PHS system have been used. However, as previously stated, the method described is applicable to other cellular systems and the applicability would be apparent to those practicing the art. For example, the method can be applied to cellular systems that use Global System for Mobile Communications (GSM). GSM is very popular throughout the world, and exists also as a high frequency version called DCS-1800 and in the USA as the PCS-1900 standard for personal communication systems (PCS). Because the steps described herein for determining transmitter power level are independent of the communication protocols, the entire method can be applied to the GSM cellular system substantially without modification.

Ongoing Power Control

The preceding description of power control methods has been primarily directed toward establishing transmitter power levels when initiating a new connection. Another aspect of the present invention is a method for continuing this initial power control by controlling transmitter power on an ongoing basis in order to deal with the dynamic nature of the communication system, and that are applicable to SDMA systems. It will be recognized that a communication system dynamically changes because of the establishment of new connections, the dropping or hand-off of existing connections, and changing RF propagation conditions. This produces a time-varying environment in which intracell and intercell connections interact. The establishment of new connections can cause unacceptable interference levels on existing connections, while canceling existing connections can reduce interference so that power levels remaining in use may be higher than required to maintain an acceptable quality of communication.

The goal of ongoing power control is to maximize the number of users while maintaining communications (as defined by some acceptable signal quality; for example, some target SINR value) for all users. For ongoing power control, we wish to minimize the total transmit power (or, more generally, a weighted sum of transmit powers) while maintaining an acceptable signal quality, e.g., $SINR \geq SINR_{target}$, for all ongoing calls. Typically, a bit error rate (BER) on the order of $10^{-3}$ is reasonable for voice signals encoded at 32 kbps using ADPCM, corresponding to a SINR on the order of 10 or 11 dB. In practice, to provide a margin of safety against fading, the value $$SINR_{target} \approx 15 \text{ dB}$$

may be used.

For communication systems that include spatial processing techniques (SDMA techniques), including true SDMA techniques in which more than one communications link is possible over the same conventional channel, the complete ongoing power control problem can then be stated as choosing the receive weights and the uplink transmit power (for uplink control) and the transmit weights and the transmit power (for downlink control), the downlink transmit power, for example, indicated by the relative magnitude of the transmit weight vector.

The goal is to maximize the capacity (number of users with SINR at least some $SINR_{target}$). Note that in general, one can state this problem with a different $SINR_{target}$ for each spatial channel/user.

The tasks of spatial weight determining and power control are tightly coupled. Any change in RF power on a conventional channel using SDMA will affect the transmit and receive weights assigned to remote users using the same conventional channel and any change in the weights will affect the power required by existing users in order to maintain an adequate communication quality level. The optimal solution requires the simultaneous solution of the SDMA multiplexing weight assignment problem and the power assignment problem. For example, on the downlink, one would determined the complete transmit weight vector, including the magnitudes, the magnitudes representing the relative transmit power on the particular spatial channel. The simultaneous solution of the SDMA multiplexing weight assignment problem and the power assignment problem is at the very least an involved computational task.

An aspect of the present invention is, for the uplink, to separate the uplink joint spatial multiplexing and power control problem into two parts: a receive weight determining part and a power adjustment part. The method starts with one part, for example power control. A power control strategy is used, and the transmit powers according to this initial strategy are assigned. Spatial receive weight assignment is now carried out with these assigned transmit powers. The resulting new spatial weights at first affect interference levels so that the initial power assignment may no longer be appropriate. Using the newly determined spatial weights, the ongoing power control technique is again applied, leading to new power assignments. These new power assignments may mean that the receive and transmit weights are no longer optimal, so that the new transmit powers are used as initial conditions for new transmit and receive weights to be determined. Thus, by iterating between the transmit power setting and the spatial processing weight determining parts, spatial weights and power control are jointly determined. Preferably, every new power control assignment and every new transmit weight assignment is used immediately after the other is determined. Thus, the environment is constantly changing.

For downlink power control, a complete transmit weight vector can be thought of as a set of relative transmit weights, all scaled by a particular scaling factor, so that determining a complete transmit weight vector simultaneously solves the problem of what relative transmit weights to use for transmitting to a particular remote user, and how much power to transmit with, the power given by the scaling applied to the relative transmit weights to form the complete weight vector. Another aspect of the present invention is, for the downlink, to separate the complete transmit weight vector determination problem, which includes power control, into two parts: a relative transmit weight vector determining part and a power adjustment part which determines the scaling to apply to the relative transmit weight vector. The method starts with one part, for example power control. A power control strategy is used, and the transmit powers according to this initial strategy are assigned. Relative transmit weight determination is now carried out with these assigned transmit powers. The resulting new relative transmit weight vector at first affect interference levels so that the initial power assignment may no longer be appropriate. Using the newly determined relative spatial transmit weights, the ongoing power control technique is again applied, leading to new power assignments.

Figure 7A:
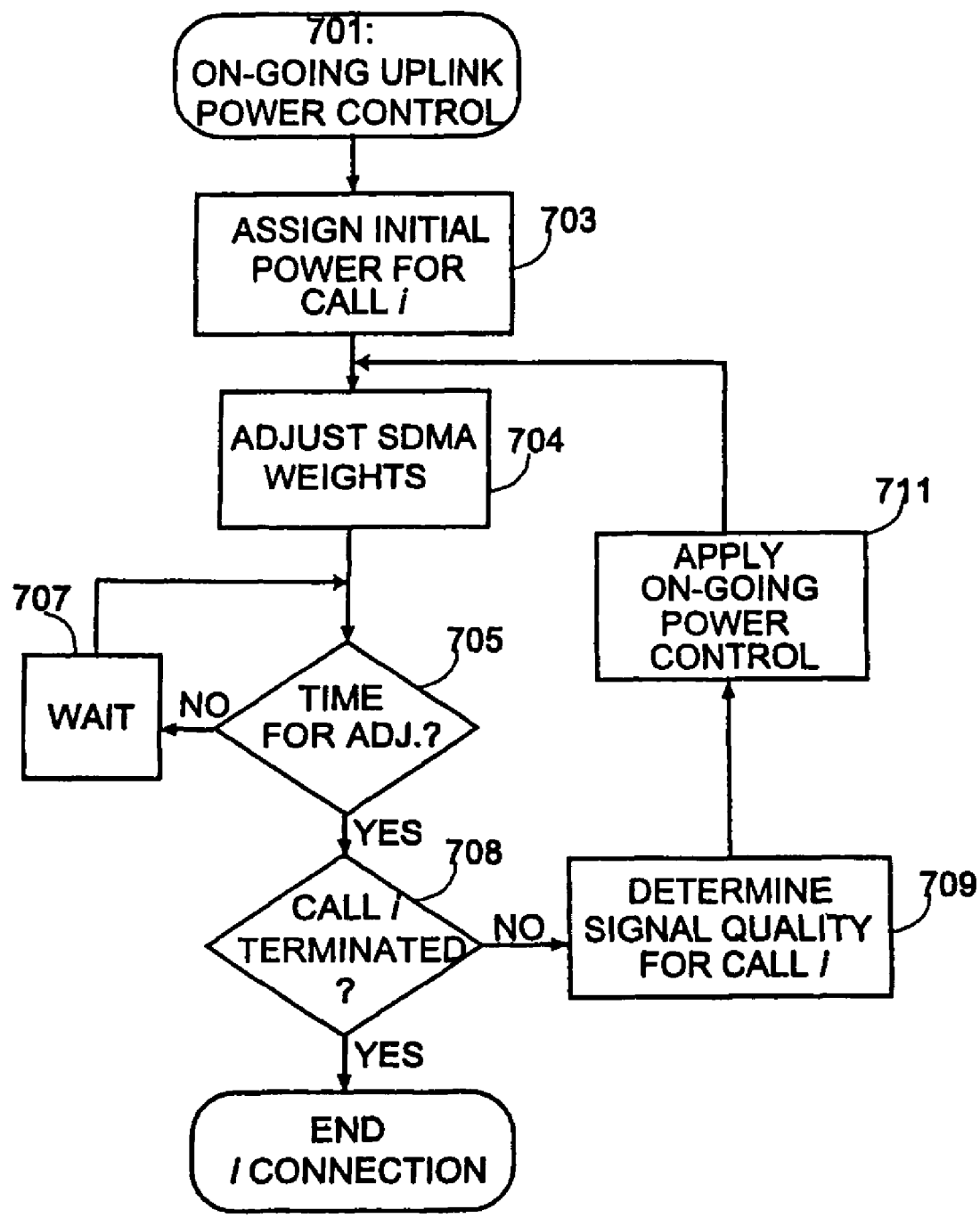
FIGS. 7(a) and 7(b) each shows a flow diagram for one embodiment of a combined initial and on-going power control method.

Uplink power control is first described with the help of FIG. 7(a), which shows ongoing uplink power control method 701. Initially, in step 703, some power is used by each SU. How to set up initial SU power assignments in the preferred embodiment is described above in the "Initial Power Control" section and in the Parent Patent. Starting with these power assignments, a set of uplink (i.e., receive) weight vectors are determined at the base station. In the preferred embodiment, the uplink (receive) weight vectors are determined in step 704 (shown for a spatial channel i) by a method substantially as described in Our Demodulation Patent, incorporated herein by reference. Note that in the preferred embodiment, these uplink weights are used by the BS to determine downlink weights. Also note that in the preferred embodiment, the system uses time division duplexing (TDD) and the uplink and downlink frequencies are identical for the same user. The uplink weights are used to determine downlink weights according to methods substantially as described in above mentioned U.S. Pat. No. 5,592,490 and in Our Calibration Patent (U.S. application Ser. No. 08/948,772, Oct. 10, 1997), both these incorporated herein by reference.

The choice of uplink weights affects the signal quality (e.g., the SINR) of the received BS (uplink) signals, so that new power control may need to be applied. Such ongoing power control is applied periodically at the base station. In the preferred embodiment, ongoing power control is applied after a pre-specified time period has elapsed, and this time period preferably is two frames in this embodiment. Thus, in step 705 for a particular spatial channel i, it is determined if it is time to apply the power control. If not, the base station waits until the next period. If it is time to apply the power control, before such control is applied, it is determined in step 708 if the call on the spatial channel should be or has been be reassigned to another channel, or should or has been handed over to another base station. If yes, the power control for this call on this spatial channel is terminated, and this is shown by the block labeled "END i CONNECTION" in FIG. 7(*a*). Otherwise, in step 709, one determines the signal quality (SINR) of the received signal at the base station. This signal quality (preferably SINR) is estimated in the preferred embodiment using the methods described below in the "Signal Quality Estimation" section of this description, (e.g., by use of Equation (20) and FIGS. 5 and 6). Based on this, the new amounts by which to ramp the uplink powers up or down are determined in step 711 for spatial channel i. See below for a description of some methods for step 711. The power control according to step 711 is carried out by commanding the remote subscriber unit (remote transmitter) on spatial channel i. The SU transmits with these new uplink powers, and one now returns to step 704 of determining new uplink (receive) weights at the BS. If insufficient compute power precludes step 704 from being performed in the current burst or the current power control period, it may be done at the next burst or the next power control period. This closes the loop. Note again that the new uplink signals are used to determine the downlink weights and thus affect downlink communication.

Figure 7B:
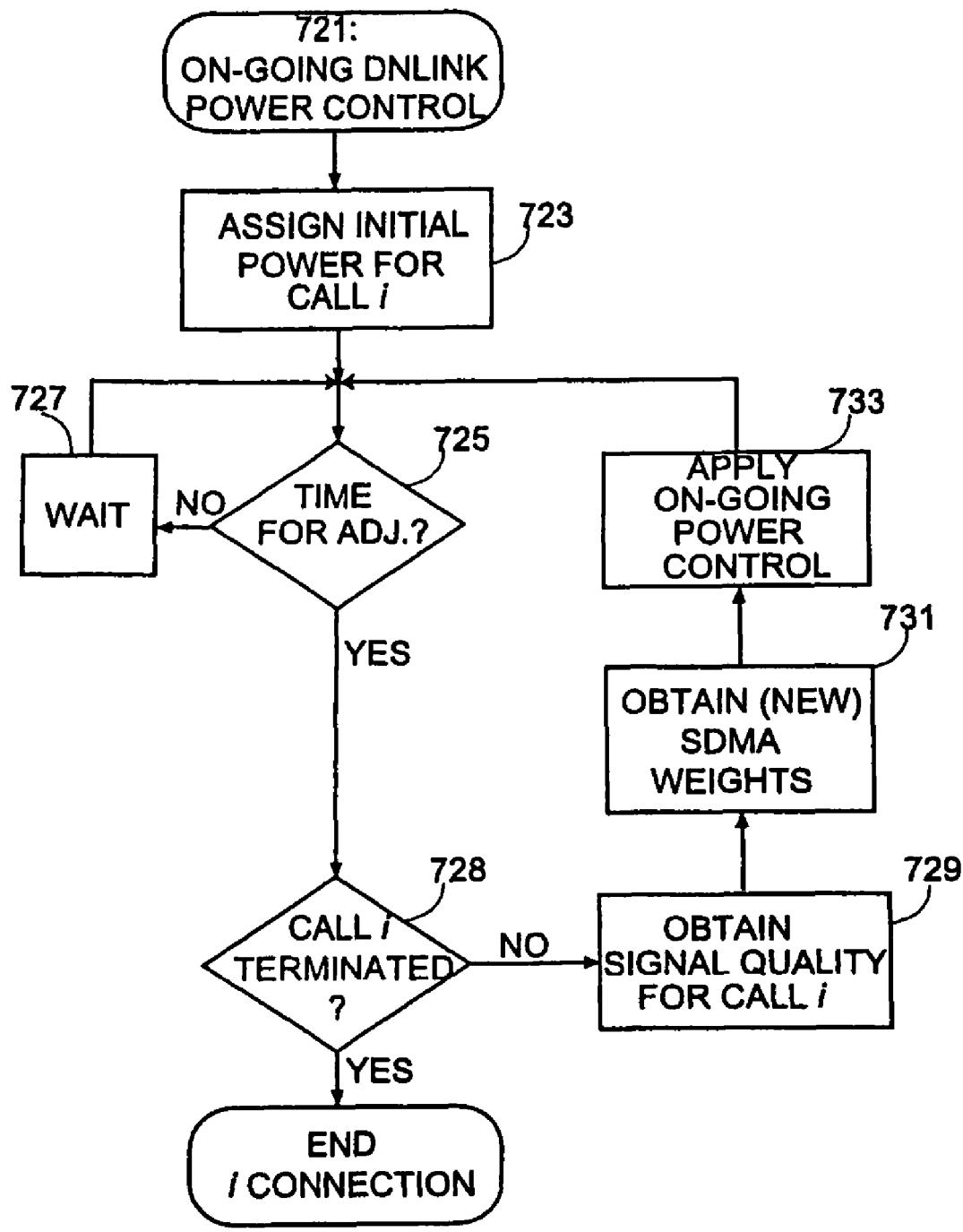

Downlink power control is now described with the help of FIG. 7(*b*), which shows a flow chart of the preferred embodiment ongoing power control method 721. One starts with an initial set of relative transmit weights. In the preferred embodiment, these transmit weights initially are those determined from uplink weights which in turn are determined from uplink signals after communications is established. The transmit weights preferably are normalized and thus are relative transmit weights. Alternate embodiments may use other methods to determine weights; e.g., one may determine directions of arrivals and perform beamforming, as is known in the art (see, for example, above-mentioned U.S. Pat. Nos. 5,515, 378 and 5,642,353). The results of all such methods will be described herein as weighting by a relative transmit weight vector, and the scaling of such a relative transmit vector is the preferred way of applying the power control. The initial power to use on the downlink on a particular spatial channel (i) to a particular SU (remote receiver) is determined and applied in step 723 using an initial power control method, preferably the method of the Parent Patent. Thus, in step 723, the relative transmit weight vector of these initial relative transmit weights for the particular SU on the spatial channel, is used to transmit at the initial transmit power level, resulting in signal received at the particular SU with some downlink signal quality (e.g., SINR). Estimates of these downlink SINRs are determined at the SUs, preferably using the method described below, and periodically sent to the BS. In the preferred embodiment, each SU performs the estimation and sends its signal quality estimate to the base station every frame. Other embodiments may do so as different intervals. The ongoing downlink power control method, like the uplink method, is applied periodically at the base station. In the preferred embodiment, this period is every two frames, and other embodiments may use other update periods. Thus, in step 725 for a particular spatial channel i, it is determined if it is time to apply the power control, and if not, the base station waits until the next period. If it is time to apply the power control, before such control is applied, it is determined in step 728 if the call on spatial channel i should be or has been reassigned to another channel, or should or has been handed over to another base station. If yes, the power control for this call on this channel is terminated, and this is shown by the block labeled "END i CONNECTION" in FIG. 7(*b*). Otherwise, the downlink signal quality estimate received from the particular SU is obtained (step 729) for use by the method and this signal quality estimate is used in step 733 for downlink power control. See below for a description of some methods for step 733. The power control according to step 733 is carried out by modifying the relative transmit weights to determine actual transmit weights to use, the modification modifying the magnitudes of the relative transmit weights for any particular SU; i.e. modifying the norm of the vector of relative transmit weights. The relative transmit weights may be the same weights as previously used if no weight updating has occurred, or updated relative weights of if updated weights are available. Thus, step 731 in the flow chart shows obtaining such (new)SDMA relative transmit weights prior to applying the ongoing power control step 733. As would be clear to one of ordinary skill in the art, step 731 of obtaining updated values of the relative transmit weight vector may occur in other points in the flow chart, and step 733 preferably uses the latest update of the relative transmit weights.

While uplink and downlink control were described above as being separate, in the preferred embodiment where uplink signals and/or weights are used to determine downlink weights, uplink and downlink control is not quite partitioned. In downlink control, the initial downlink weights and powers are based on those determined in uplink power control and weight determination.

The details of the alternate embodiments of determining and applying the power control methods (steps 711 and 733 for the uplink and downlink, respectively) are now described. Several methods for carrying out a power assignment step such as steps 711 for the uplink and step 733 for the downlink are known for conventional cellular systems, and many of these methods may be easily adapted for use in implementing the present invention. There are advantages, however, in using the novel methods suggested herein below for the power assignment steps 711 and 733. The invention, however is not restricted to only using the below described methods for steps 711 and 733.

The Global Problem

The overall problem solved herein of what power to apply in steps 711 and 733 first is described mathematically. Define $p_i$ as the transmit power for the ith transmitter (in a SU for uplink or in a BS for downlink) in the communication system. Unless otherwise noted, all power quantities are in a natural scale (e.g., power measurements are in Watts, not dB). The task is to determine (separately on the uplink and on the downlink) the powers pi (positive) for all i (i.e., all transmitters) that minimize for the whole system (on the uplink, or on the downlink) the total power. An even more general formulation is to determine the powers $p_i$ (>0) that minimize for the whole system the weighted sum of all the powers, i.e., the objective function $$J = \sum_i c_i p_i, \qquad (1)$$

where subscript i indicates the ith transmitter, whether uplink (a SU) or downlink (a base station), $p_i$ is the transmit power for the ith transmitter, and $c_i$ is a positive parameter indicating the relative weight of the transmit power for the ith transmitter. When $c_i=1$ for all i, the criterion is to find the powers that minimize the total power. Note that interfering users may be intercell or intracell users or both. For uplink determination (in step 711), there is an index i for every uplink connection in the global system. Similarly, for downlink determination (in step 733), there is an index i for every downlink connection in the global system. The general formulation (of having different $c_i$ values) allows one to specify which connections are more important than others. For example, a particular $c_i=0$ means that on that spatial channel, no attempt to minimize the transmit power is made so that the highest quality is maintained.

The above minimization problem is constrained by the requirement to maintain an acceptable quality of communication. That is, the predicted SINR needs to be at least the value of the target SINR for all communication links. To express this mathematically, consider first the uplink. Define $G_{ij}$ to be path loss (and/or gain) for the path from transmitter j to receiver i. On the uplink, the transmitter is a SU and the receiver is a BS, while on the downlink, the transmitter is the BS and the receiver is the SU. $G_{ij}$ includes the RF path loss experienced between transmitter j and receiver i, the spatial processing rejection or gain factor, and any other attenuation or gain factor along the path from transmitter j to receiver i. Also define $\sigma_i^2$ as the effective background noise level experienced by the ith subscriber unit (on the downlink) or BS (on the uplink) (after reception and any spatial processing), and define $SINR_i$ as the SINR target for receiver i.

The goal then to determine, on the uplink for SU power control step 711, and on the downlink for BS power control step 733, the powers $p_i$ ($p_i>0$) that minimize for the whole system the objective function of Equation (1) while ensuring that $$\frac{G_{ii} p_i}{\sum_{j \neq i} G_{ij} p_j + \sigma_i^2} \geq SINR_{target_i}. \qquad (2)$$

The optimization problem of Equations (1) and (2) for non-negative transmit powers may be recognized as linear programming optimization problems in non-negative variables (the transmit powers). Many methods are known for solving such linear programming problems. One well-known method that may be used is the Simplex method described, for example, in Murty, K. G., Linear Programming, Wiley & Sons, New York, 1983.

Distributed Solutions

The above globally optimal method in general requires communications of power control information between base stations of the system. There may be practical difficulties with directly determining a globally optimal method when dealing with a large number of intercell and intracell connections. For example, the computation time may be too long relative to the rate of change of connection conditions; and, it may not be feasible or practical to gather the necessary power control information, such as the path gain $G_{ij}$ between every base station and every remote subscriber unit in real time. In one embodiment, the global objective may be simplified to be true within some subset of the overall system, for example, within a particular cell of interest. In the case of the subset being a particular cell, the objective of ongoing uplink power control is to substantially minimize the total power transmitted by all subscriber units within a cell of a communication system while ensuring that the desired SINR for every connection to the BS within the cell is satisfied. Similarly, for ongoing downlink power control, the objective is to minimize the total power transmitted by the BS to all its SUs while maintaining a target level of communications. The resulting uplink and downlink power control methods wherein the objective is simplified to be required within some subset of the communication system, and wherein every subset is allowed to achieve its own objective, is referred to herein as a distributed method. The distributed power control strategy only requires the set of path gains between the base station and each subscriber unit belonging to the same cell. No direct base station to base station (i.e., intercell) communication is required. It is possible that using only distributed, locally optimal decisions will result in globally optimal system behavior.

The distributed method includes breaking up a global optimization problem into many small localized optimization problems which are solved simultaneously at each base station in the communication system, and for each conventional channel on each such base station.

Method 1 for the Distributed Power Determination

The first preferred embodiments ("Method 1") for carrying steps 711 and 733 using distributed methods are now described. The procedures for both the uplink and the downlink are at each base station to periodically update the applied power for each subscriber unit (that is, each spatial channel), the updating based on some function of the most recently (typically the presently) applied power, the minimum acceptable signal to interference-plus-noise level (SINR), and the most recently (typically the presently) observed (i.e., estimated) SINR for the spatial channel used in communicating with the SU. This signal quality (SINR) is estimated in the preferred embodiment using the methods described below (e.g., by use of Equation (20) and FIGS. 5 and 6). The updating preferably every two frames, and other update periods may be used, as well as different uplink and downlink update periods. To describe the power determination method mathematically, let K denote the most recent (say Kth) update of the power control, let superscript i denote a particular subscriber unit, and let superscripts D and U denote downlink (i.e., in step 733) and uplink (i.e., in step 711), respectively. Unless otherwise noted, all power and power ratios are assumed in natural (i.e., linear) units (e.g., WATTS) rather than logarithmic units (e.g., dB). Let $p_i(K)$ be the transmitted power for the ith user for the Kth update. Let $SINR_{target_i}$ be the minimum acceptable SINR for this user, and let $\overline{\overline{SINR_i(K)}}$ be the most recently (and usually the presently) experienced SINR for this user as determined by an SINR estimator (estimation is indicated by the double overbar). Note the above SINR and the $p_i(K)$ quantities have the D or U superscripts omitted for simplicity.

The power control (steps 711 on the uplink and step 733 on the downlink) then is applied as follows from update period to update period. For the next (i.e., (K+1)th) update, the transmitter power of the ith user is updated according to the following iterative rule. On the uplink for user i, the updated power to use (the (K+1)'th update) is a function of the target SINR for that user and the previously applied powers and the previous estimates of the SINR for that receiver. That is, for user i, $$p_i^U(K+1) = f^U\left(\{p_i^U(J)\}_{J=1}^K, \left\{\overline{\overline{SINR_i^U(J)}}\right\}_{J=1}^K, SINR_{target_i}^U\right),$$

where $f^U$ is some function. In one embodiment, the function $f^U$ includes only the most recent (i.e., Kth) and the previous to most recent (i.e., (K−1)'th) SINR estimate and only the most recent applied power. That is, $$p_i^U(K+1) = f^U\left(p_i^U(K), \overline{\overline{SINR_i^U(K-1)}}, \overline{\overline{SINR_i^U(K)}}, SINR_{target_i}^U\right).$$

In a second embodiment, $$p_i^U(K+1) = f^U\left(p_i^U(K), \overline{\overline{SINR_i^U(K)}}, SINR_{target_i}^U\right).$$

Similarly on the downlink, $$p_i^D(K+1) = f^D\left(\{p_i^D(J)\}_{J=1}^K, \{\overline{\overline{SINR_i^D(J)}}\}_{J=1}^K, SINR_{target_i}^D\right),$$

where $f^D$ is some other function. In one embodiment, the function $f^U$ includes only the most recent (Kth) and the previous to most recent (i.e., (K−1)'th) SINR estimate and only the most recently applied power. That is, $$p_i^D(K+1) = f^D\left(p_i^D(K), \overline{\overline{SINR_i^D(K-1)}}, \overline{\overline{SINR_i^D(K)}}, SINR_{target_i}^D\right).$$

In a second embodiment, $$p_i^D(K+1) = f^D\left(p_i^D(K), \overline{\overline{SINR_i^D(K)}}, SINR_{target_i}^D\right).$$

In the preferred embodiment, for all users i on the uplink step 711 and downlink step 733, the same function is used. That is $f^D = f^U$. In particular, $$p_i^D(K+1) = \left(\frac{SINR_{target_i}^D}{\overline{\overline{SINR_i^D(K)}}}\right)^\mu p_i^D(K) \tag{3a}$$

and $$p_i^U(K+1) = \left(\frac{SINR_{target_i}^U}{\overline{\overline{SINR_i^U(K)}}}\right)^\mu p_i^U(K), \tag{3b}$$

respectively, where $\mu$ is some constant. The description of Equations (3) provide for different target levels of quality of communications for each spatial channel and for the uplink and downlink. In the preferred embodiment, the target SINRs are the same for all users i and are the same for the uplink step 711 and the downlink step 733.

This embodiment can now be described with all quantities in a logarithmic scale (e.g., power and/or SINR measurements and/or estimates are in dB) rather than in a natural scale. Subscript L is used to denote logarithmic scale. Again, let K denote the most recent (say Kth) iteration of power control, and let $SINR_{Ltarget_i}$ be the minimum acceptable SINR (log scale) for a particular spatial channel i, and let $\overline{\overline{SINR_{L_i}(K)}}$ be its most recently experienced SINR (log scale) as determined by an SINR estimator (shown independent of the SU for simplicity). For a particular spatial channel i, let $p_{Li}(K+1)$ be the transmit power (in log scale) to use for the next update (two frames later, in the preferred embodiment), and let $p_{Li}(K)$ be the most recently applied power (in log scale). The power control, according to the first preferred embodiment is to use in the next iteration the power (log scale) used in the most recent iteration plus an increment which is some function of the difference between the target SINR (log scale) and an estimate of the most recently experienced SINR (log scale). Preferably, the function is proportionality, so that the procedure is to update the applied power based on the most recently (e.g., the presently) applied power and the difference between the minimum acceptable SINR and the estimated SINR (all in log scale). Mathematically, in both the uplink step 711 (with superscript U not shown but understood) and downlink step 733 711 (with superscript D not shown but understood), for each i, $$P_{Li}(K+1) = P_{Li}(K) + \mu(SINR_{Ltarget_i} - \overline{\overline{SINR_{Li}(K)}}), \tag{4}$$

where the powers and SINRs are in logarithmic scale and $\mu$ is a constant, which in the preferred embodiment is 0.12. Note that $SINR_{Ltarget_i}$ may be different for each spatial channel. For example, when one has both voice and data traffic, for 32 kbps voice as used in PHS (adaptive differential PCM), a $SINR_{Ltarget}$ of 15 dB may be good enough, while for a data channel, the desired BER may be in the order of $10^{-6}$ to $10^{-8}$ which would correspond to an approximate $SINR_{Ltarget}$ of 21 dB. In the preferred embodiment, the same value, $SINR_{Ltarget}$ is used for all spatial channels. The power control step 711 using Equation (4) with superscript U is carried out for each spatial channel on the uplink, and the power control step 733 using Equation (4) with superscript D is carried out for each spatial channel on the downlink. Note that while Equation (4) described adjusting the power according to a linear function of the difference (in log scale, e.g., in dB) between the target and actual estimated SINR, the method in steps 711 or 733 may be generalized to an adjustment of the transmit power (in log scale) according to some (e.g., nonlinear) function (say functioned) of the difference between the target and actual estimated SINR:

$$P_{Li}(K+1) = P_{Li}(K) + fn(SINR_{Ltarget_i} - \overline{\overline{SINR_i(K)}}), \tag{5}$$

where the superscripts U or D are left out from each variable and $fn$ for simplicity. Again, the power control (step 711 on the uplink and step 733 on the downlink) using Equation 5 is carried out for all spatial channels at each of the cells of the communication system. No base station to base station communication therefore need be used.

It should be noted that because this method does not require any knowledge of the transmission gains, there is no need to model and/or measure the spatial processing gains, path gains, or distinguish between intracell vs. intercell interference. The method only requires a reliable SINR estimator such as the carrier modulus moment method described below (the "signal quality estimation" aspect of the invention).

Method 2 for the Power Determination

The second embodiment of the distributed power control problem (steps 711 or 733) is to explicitly find a solution to the localized optimization problem for the uplink and for the downlink. When localized, the optimization problem can be stated as follows. At any single base station, let there be d spatial channels in the conventional channel. Natural (linear) scale again is used in the following description for all powers and SINRs. The task is to find the positive powers pi that minimize the weighted sum of the powers, i.e., the objective function $$J = \sum_{i=1}^{d} c_i p_i, \tag{6}$$

where as before subscript i indicates the spatial channel, $p_i$ is the transmit power (in linear units) for the ith spatial channel, and $c_i$ is a positive parameter indicating the relative weight of the transmit power for the ith spatial channel. In the preferred embodiment, $c_i=1$ for all i so that the criterion is to minimize the total power. In alternate embodiments, some spatial channels may be more important than others and different values of $c_i$ may be chosen to reflect this.

The above minimization problem is constrained by the requirement to maintain a minimum quality of communication. That is, the predicted SINR when one uses a particular spatial weight (say, on the downlink, $w_i^D$) in spatial channel (denoted i) needs to be at least the value of the target SINR for that spatial channel, for all spatial channels. To express this mathematically, for implementation in downlink power control step 733, define the following quantities:

$L_i^D$ is the path loss (or gain) for spatial channel i and its associated SU;

$w_i^D$ is the downlink (i.e. transmit) multiplexing weight vector (of weights) for user (i.e., spatial channel) i, with the vectors each having Euclidean norm 1. That is, $\|w_i^D\|=1$ for all i where for any vector x with complex valued elements $x_l$ having real and imaginary parts $x_{Rl}$ and $x_{Il}$, respectively, $l=1, \ldots, m$, $$\|x\| = \sqrt{\sum_{j=1}^{m} x_{Rj}^2 + x_{Ij}^2};$$

$a_i^D$ is the spatial signature of the ith remote user on the downlink on this base station, with $\|a_i^D\|=1$ for all i. See above mentioned incorporated-by-reference U.S. Pat. No. 5,592,490 for a formal definition of the spatial signature; and $I_i^D$ is the downlink post-spatial processing noise-plus-intercell (i.e., out-of cell) interference experienced by subscriber i.

$|w_i^{D*} a_i^D|^2$ is then a measure of the beamforming gain in the direction of user i, and for $j \neq i$, $|w_j^{D*} a_i^D|^2$ is a measure of the gain from undesired spatial channel j in the direction of user i, where the * indicates the complex conjugate transpose (also called the Hermitian transpose). The constraint that the predicted SINR when one uses a particular spatial weight vector for spatial channel i needs to be at least the value of the target SINR for that spatial channel, can then be expressed as, on the downlink, $$\frac{L_i^D |w_i^{D*} a_i^D|^2 p_i^D}{\sum_{j \neq i, j=1}^{d} L_i^D |w_j^{D*} a_i|^2 p_j^D + I_i^D} \geq SINR_{target_i}^D, \tag{7a}$$

and the downlink optimization problem (for step 733) is to find the positive set of $p_i^D > 0$ such that J $$J^D = \sum_{i=1}^{d} c_i^D p_i^D \tag{7b}$$

is minimized subject to the constraint of Equation (7a), where the quantities are as before with superscript D to indicate the downlink.

Similarly, for use on the uplink power control step 711, using superscript U to denote uplink for the same quantities as defined above with superscript D for the downlink, the constraint that the predicted SINR when one uses a particular spatial weight $w_i^U$ for spatial channel i needs to be at least the value of the target SINR for that spatial channel, can then be expressed as $$\frac{L_i^U |w_i^{U*} a_i^U|^2 p_i^U}{\sum_{j \neq i, j=1}^{d} L_j^U |w_i^{U*} a_j|^2 p_j^U + I_i^U} \geq SINR_{target_i}^U, \tag{8a}$$

and the uplink optimization problem is to find the $p_i^U > 0$ such that $$J^U = \sum_{i=1}^{d} c_i^U p_i^U \tag{8b}$$

is minimized subject to the constraint of Equation (8a).

The set of weights, $\{w_i^D\}$ and $\{w_i^U\}$, and the sets of spatial signatures, $\{a_i^D\}$ and $\{a_i^U\}$, of existing connections are usually known or can be determined by known methods by the base station(s). See for example, above mentioned incorporated-by-reference U.S. Pat. No. 5,592,490. Any means for so determining these quantities is called a spatial processor herein.

Figure 5A:
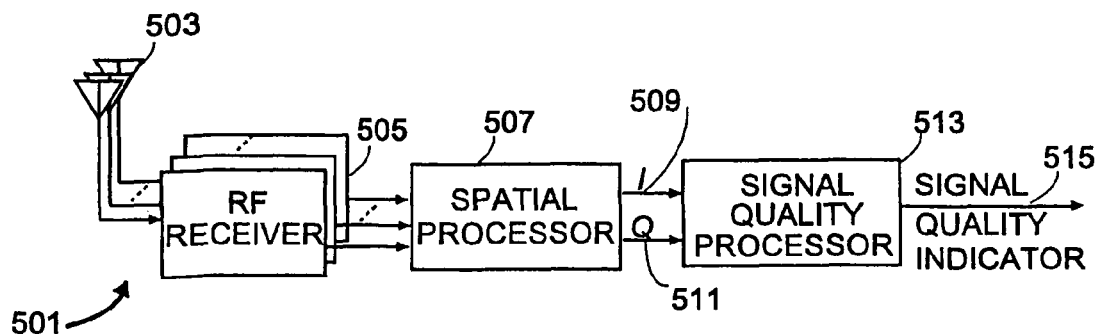
FIG. 5(a) shows an embodiment of an apparatus including spatial processing on which the signal quality aspects of the present invention may be realized.
Figure 5B:
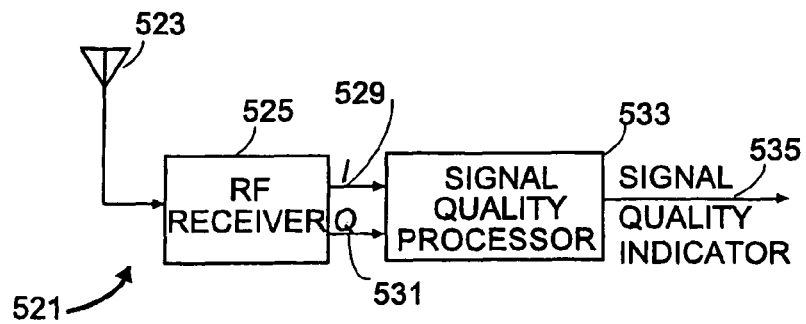
FIG. 5(b) shows another embodiment of an apparatus on which the signal quality aspects of the present invention may be realized.
Figure 6:
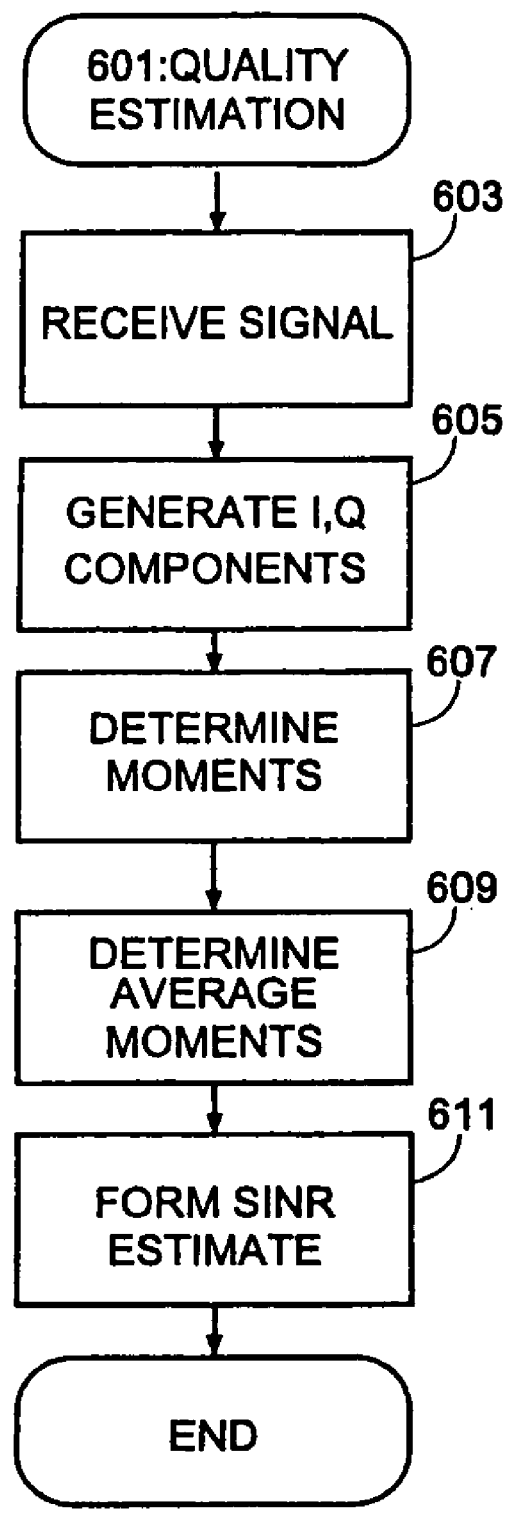
FIG. 6 is a flow diagram for a method for obtaining a signal quality estimate in an angle-modulated communication systems.

The path gains, $\{L_i^D\}$ and $\{L_i^U\}$, can be estimated as follows. First, the RSSI is estimated as $E(R^2) \approx \overline{R^2}$ according to Equation (19b) as described below in the description of the "signal quality estimation" aspect of the invention. The RSSI is then measured after the receive spatial demultiplexing for each spatial channel. Note that in the preferred embodiment, the RSSI is available at input to the demodulator, a decision feedback demodulator. See above-mentioned incorporatedby-reference U.S. patent application Ser. No. 08/729,390. This is used as before to estimate the signal quality as expressed by SINR. That is, $$L_i^D = RSSI_i^D \bigg/ p_i^D \left(1 + \frac{1}{\overline{SINR_i^D}}\right) \quad (9a)$$

$$L_i^U = RSSI_i^U \bigg/ p_i^U \left(1 + \frac{1}{\overline{SINR_i^U}}\right), \quad (9b)$$

where $\overline{SINR_i^D}$ and $\overline{SINR_i^U}$ respectively are the downlink and uplink estimated signal to interference-plus-noise ratio experienced by the ith subscriber unit and its associated base station (using the methods previously described as in Equation (19) and (20) and FIGS. 5 and 6), and the $p_i^D$ and $p_i^U$ are the known downlink and uplink transmit power used by the base station associated with the ith subscriber and base station associated with the ith subscriber during each of the last transmitted bursts.

As a first alternative to using Equations (9a) and (9b), since one knows the power being transmitted during initial call set up, the path loss can be obtained by measuring the average power at the antennas.

As another alternative, in some systems, such as systems using the IS-95 CDMA standard, a pilot tone exists and is continually transmitted at a known power level on the downlink. Using a pilot tone such in this way can be used to determine the path loss. Thus several methods may be used to determine the pass loss.

While the method of the invention is not restricted to such systems, note that for TDD systems such as PHS, it is reasonable to assume that the path loss is identical for the uplink and downlink.

The intercell downlink and uplink interference-plus-noise ($I_i^D$ and $I_i^U$) are estimated as follows. Let K represent the time update index and K−1 represent the previous time period. Then for the present (Kth) update, $$I_i^D(K) = RSSI_i^D(K) - L_i^D(K) \sum_{j=1}^{d} |w_j^{D*}(K)a_i^D(K)|^2 p_j^D(K-1) \quad (10a)$$

$$I_i^U(K) = RSSI_i^U(K) - \sum_{j=1}^{d} |w_i^{U*}(K)a_j^U(K)|^2 p_j^U(K-1)L_j^U(K). \quad (10b)$$

In another alternate embodiment, the following formulation is used for estimating the downlink and uplink interference-plus-noise $I_i^D$ and $I_i^U$). Again, K is used in the following equation as an index to represent the value for the present calculation:

$$I_i^D(K) = \frac{RSSI_i^D(K)}{1 + \overline{SINR_i^D(K)}} - L_i^D(K) \sum_{j \neq i} |w_j^{D*}(K)a_i^D(K)|^2 p_j^D(K-1) \quad (11a)$$

$$I_i^U(K) = \frac{RSSI_i^U(K)}{1 + \overline{SINR_i^U(K)}} - \sum_{j \neq i} |w_i^{U*}(K)a_j^U(K)|^2 p_j^U(K-1)L_j^U(K). \quad (11b)$$

In one embodiment of explicitly solving the localized power control optimization problem, Equation (7) (as part of downlink step 733) and Equation (8) (as part of uplink step 711) are each solved at each base station as a linear programming problem. Any known method of solving the linear programming problem may be used.

In a second (the preferred) embodiment of explicitly solving for the localized power controls, the constraints in Equations (7a) and (8b) are modified to be equality constraints. That is, in the preferred embodiment, one determines the powers in the downlink and uplink, respectively, by solving Equations (7a) and (8a), respectively, with equality constraints. That is, in a conventional downlink channel, the set of powers to apply for downlink communications for the spatial channels in any conventional downlink channel are determined be setting the predicted downlink SINR in each downlink spatial channel of the conventional downlink channel to be equal to a target SINR for that downlink spatial channel. In the preferred embodiment, the target SINR is the same for all downlink spatial channels of the conventional uplink channel. Also, in a conventional uplink channel, the set of powers to apply for uplink communications for the spatial channels in any conventional uplink channel are determined be setting the predicted uplink SINR in each uplink spatial channel of the conventional uplink channel to be equal to a target SINR for that uplink spatial channel. In the preferred embodiment, the target SINR is the same for all uplink spatial channels of the conventional uplink channel.

Assuming that solving the localized power control minimization problem at each base station eventually leads to a globally optimal solution (when no quantities such as path gains change, there are no new calls, etc.), using equality is physically intuitive: in order to minimize total power, one should only allocate enough power to satisfy the desired acceptable level of performance, and no more.

When Equations (7a) and (8a) are modified to be equality constraints, each of these equations may then be transformed to linear equations of the form, for use in downlink step 733, $$L_i^D |w_i^{D*} a_i^D|^2 p_i^D - SINR_{target_i}^2 \sum_{j \neq i, j=1}^{d} L_j^D |w_j^{D*} a_i|^2 p_j^D = I_i^D SINR_{target_i}^D \quad (12a)$$

and for use in uplink step 711, $$L_i^U |w_i^{U*} a_i^U|^2 p_i^U - SINR_{target_i}^U \sum_{j \neq i, j=1}^{d} L_j^U |w_i^{U*} a_j|^2 p_j^U = I_i^U SINR_{target_i}^U. \quad (12b)$$

Each of these will immediately be recognized to be a set of linear equations expressible in matrix form as Ap=b where A is a square matrix of dimension d (the number of spatial channels), p is the vector of powers (the superscripts U and D are left out for simplicity), and b is a vector of target SINRs multiplied by the interference and noise ($I_i$) quantities. Sets of Equations (12a) or (12b), when expressed in matrix form, each have an exact solution in the matrix form $$p=A^{-1}b. \quad (13)$$

Substituting the values of $L_i$, $w_i$, $a_i$, $I_i$, and $SINR_i$ (again, the superscripts U and D are left out for simplicity) produces the values of the $p_i$ exactly.

If any of the so obtained $p_i$ values is negative, there is no feasible solution to the optimal power control problem. Several options exist. In the preferred embodiment, channel reassignment is carried out according to the channel reassignment procedure for the system.

Figure 8A:
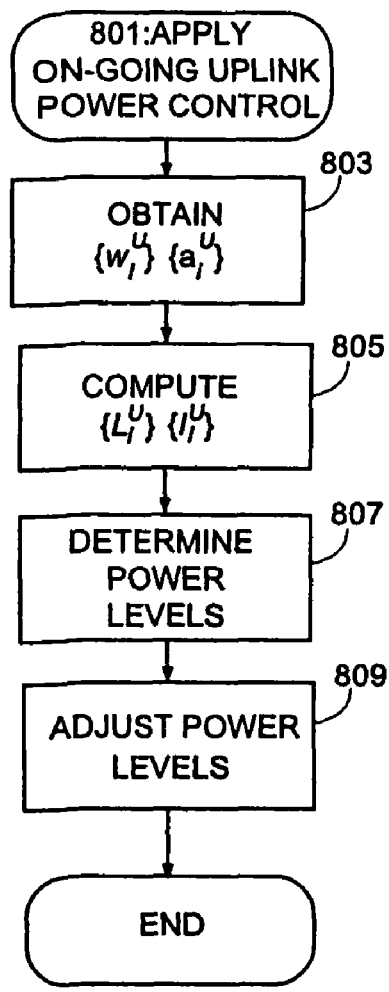
FIGS. 8(a) and 8(b) each shows a flow diagram for one embodiment applying the on-going power control, for example, in the methods shown in the respective flow charts of FIGS. 7(a) and 7(b).
Figure 8B:
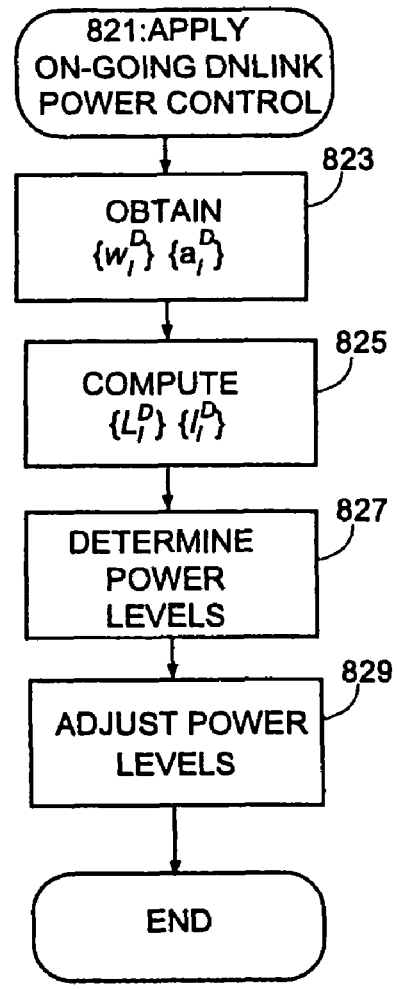

FIGS. 8(a) and 8(b), respectively, are flow diagrams showing using this second embodiment for steps 711 and 733, respectively, for uplink and downlink ongoing power control, respectively. FIG. 8(a) shows such an embodiment 801 of step 711 for applying on-going uplink power control for a given SDMA channel i. In step 803, the process obtains from the spatial processor, for all i, the uplink quantities $\{w_i^U\}$ and $\{a_i^U\}$. Then, in step 805, for all i, using the estimates $\overline{SINR_i^U}$ obtained (step 709), the sets of path gains, $\{L_i^U\}$, are computed using Equations (9b), and the interference plus noise quantities $\{I_i^U\}$ also are determined using Equations (10b) or (11b). In step 807, the uplink power assignments are determined, preferably by solving the equality constraint problems (Equations (12b) and (13)). In step 809, the uplink power levels are adjusted in accordance with the solution obtained in step 807 by commanding the SUs to use such powers, and the process ends (returning to step 704). FIG. 8(b) similarly shows an embodiment 821 of step 721 for applying on-going downlink power control for a given SDMA channel i. In step 823, the process obtains from the spatial processor, for all i, the downlink quantities $\{w_i^D\}$ and $\{a_i^D\}$. Then, in step 825, for all i, the sets of path gains, $\{L_i^D\}$, are computed using Equations (9a), and the interference plus noise quantities $\{I_i^D\}$ also are determined using Equations (10a) or (11a). In step 827, the downlink power assignments are determined, preferably by solving the equality constraint problems (Equations (12a) and (13)). In step 829, the downlink power levels are adjusted in accordance with the solution obtained in step 827, and the process ends (returning to step 724).

Signal Quality Estimation

Step 313 of method 301 for initial power control included determining the signal quality. Also, both the ongoing power control method using Equations (3) or (4) and the localized power control method explicitly solving Equations (7) and (8) include using an estimate of a measure (the SINR) of the signal quality (see steps 709 and 729 in flow charts 701 and 721, respectively). Another aspect of the invention is a method for implementing such steps. While any methods for determining these estimates may be used in implementing the power control aspects of the invention, another aspect of the invention is a RF carrier signal quality estimator method and apparatus which is applicable to all angle-modulated RF carriers. Because of the large variety of these angle-modulated systems, the detailed description will be only for one of two types in order to increase understanding of the invention. The two sample angle-modulated signals selected for this purpose are a quaternary phase shift keyed (QPSK) signal and a differential quaternary phase shift keyed signal (DQPSK) that are found in wide-spread use in the communication field. Each symbol in these schemes contains two bits (a dibit) of information. The important feature of the phase modulated signal with respect to the signal quality estimation aspect of the current invention is that the magnitude of the data symbols is assumed to be constant in the absence of noise or other forms of corruption. The number of discrete phase levels (four in these cases) is not important. The difference between these two signals is that in DQPSK, a dibit is mapped onto the phase difference between two successive symbols, while in QPSK, a dibit is mapped onto the phase of the symbol itself. Thus, the phase plane of a QPSK signal is the same as the differential phase plane of a QPSK signal, which is the phase plane of the phase difference between two successive symbols. Also, in QPSK, the four symbol points used in the description are 0, $\pi/2$, $\pi$, and $3\pi/2$, while in the particular DQPSK used in the preferred embodiment, $\pi/4$ DQPSK, the four symbol points used are, in the differential phase plane, $\pi/4$, $3\pi/4$, $5\pi/4$ and $7\pi/4$ (that is, $\pm\pi/4$ and $\pm3\pi/4$). That is, the above QPSK phase plane is rotated by $\pi/4$ for the $\pi/4$ DQPSK case. It will be clear to those of ordinary skill in the art how to implement for one case from a description of the other case. From the following description, it will also be clear to those of ordinary skill in the art how to adapt the application of the principles to other forms of angle-modulation systems.

Figure 4:
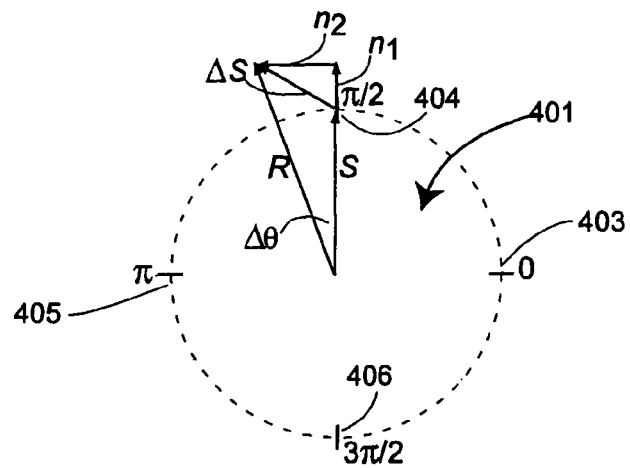
FIG. 4 shows a phase diagram of a typical QPSK signal, including in-phase and quadrature errors.

FIG. 4 is a complex phase plane diagram 401 of the four states of a QPSK model, except that an extraneous noise vector, $\Delta S$, and resultant phase error, $\Delta \theta$, have been added to represent the practical situation in which the presence of noise and interference introduces both amplitude and phase errors into the observed data symbol R. Vector $\Delta S$ corresponds to the vector difference between the uncontaminated symbol S and the observed symbol R.

FIG. 4 is a complex phase plane representation of a received data symbol signal R on the phase plane. Also shown on the phase plane 401 are the four decision points 403, 404, 405, and 406 at phases 0, $\pi/2$, $\pi$, and $3\pi/2$, respectively (the constellation of decisions). Any frequency offsets present may be thought of as rotations of the constellation points relative to the received signal R. R may be thought of as a constant modulus signal S, onto which an extraneous noise vector $\Delta S$ has been added, resulting in phase error $\Delta \theta$. $\Delta S$ represents noise and interference which in practice is present and introduces both amplitude and phase errors into the observed data symbol R. That is, vector $\Delta S$ corresponds to the vector difference between the uncontaminated symbol S and the observed symbol R. The SINR thus may be estimated by estimating the ratio of the squared magnitudes of S and $\Delta S$. That is, $SINR=E[S^2]/E[\Delta S^2]$. The essence of the preferred embodiment signal quality estimator is to estimate the SINR of the received signal entirely from observations of radius R over a burst of received data. This exploits the fact that radius R is invariant to rotations of the constellation, thus making the SINR estimate substantially immune to frequency offsets.

For the purpose of explanation, the noise and interference vector, $\Delta S$, is modeled as a zero-mean Gaussian random process with independent real (i.e., in phase I) and imaginary (i.e., quadrature Q) components, each component with a variance of $\sigma^2$. This model is chosen because it leads to a realistic and practical method for determining the modulus S and the statistical evaluation of the associated noise and interference vector. While this model is used in explaining the method, the method works for actual signals and noise for which the zero-mean Gaussian random process assumption may not hold.

An embodiment is now described of a method for estimating the signal-to-interference-plus-noise (SINR) for a received signal. This is applicable for power control applications, including step 313 of power control method 301 and in each of the steps in the ongoing power control embodiments that include having an SINR estimate. In FIG. 4, vector $\Delta S$ may be represented as the sum of two orthogonal zero-mean Gaussian noise components, one noise component ($n_1$) in-phase with carrier vector S, and the other a quadrature component ($n_2$), both $n_1$ and $n_2$ each having a variance of $\sigma^2$, as shown in FIG. 4. The quantity to be estimated, the SINR, is then $$SINR=E[S^2]/2\sigma^2. \quad (14)$$

If the modulus of signal S is substantially constant over a burst, then received signal amplitude R is approximately Rician distributed, with $$E[R] = \sqrt{2\sigma^2} f(SINR), \quad (15)$$
where $$f(SINR) = e^{-SINR} \sum_{l=0}^{\infty} \frac{\Gamma\left(\frac{3}{2}+l\right) SINR^l}{\Gamma\left(\frac{1}{2}+l\right) l!}, \text{ and}$$

$$E[R^2] = E[S^2] + 2\sigma^2 \quad (16)$$
$$= 2\sigma^2(1 + SINR).$$

Given values of E[R] and E[R²], Equations (15) and (16) are two (nonlinear) equations in two unknowns ($\sigma^2$ and SINR). Thus one embodiment of the method is to simultaneously solve Equations (15) and (16) for SINR. Values of $f(SINR)$ according may be pre-stored in a lookup table. Alternatively, the approximation $f(SINR) \approx 1$ may be used. In the preferred embodiment, the complex valued baseband signal for the communications channel preferably is provided as in-phase and quadrature components, denoted by I and Q, respectively. The values of $E\{R^k\}$, k=1, 2, etc., are estimated by determining $R^2=(I^2+Q^2)$ for each sample in a burst. Note that the average of the $(I^2+Q^2)$ values over a set of samples is a measure of the received signal strength indicator (RSSI), commonly available in receivers. Denote the sampled values of I and Q by I(n) and Q(n), respectively, where each successive sample n is ideally an on-baud sampling point, the on-baud sampling point for a given pulse-shaped symbol corresponds to the center point in time of the pulse-shaped symbol. In practice, due to imperfections in timing alignment, the on-baud sampling point corresponds to the time sample closest to the center of the pulse-shaped symbol. Thus, successive samples in I(n) and Q(n) are one baud period apart. Note that these I and Q values are for a single modulated signal of a single (spatial) channel. Thus, in the system of the preferred embodiment, these are the I and Q values after spatial processing and substantially on the baud points. In the receiver of the transceiver of FIG. 1, the output downconverter/filter 131 are the sampled signals for one antenna only—that is, before spatial processing, and are oversampled. Determining signals I(n) and Q(n) after spatial processing at or close to the baud points is thus assumed to have been carried out, preferably in the corresponding RX DSP 209. See Our Demodulation Patent (above mentioned U.S. patent application Ser. No. 08/729,390) for a discussion of one example of processing including determining signals I(n) and Q(n) after spatial processing at or close to the baud points. Denote by N the number of samples in a burst. The sampled modulus information is extracted by forming the sum of the squares of the in phase and quadrature signals, $$R(n) = \sqrt{I^2(n) + Q^2(n)}, \quad (17a)$$

$$R^2(n) = I^2(n) + Q^2(n), \text{ and} \quad (17b)$$

$$R^4(n) = (I^2(n) + Q^2(n))^2. \quad (17c)$$

$E\{R^k\}$ is then approximated by computing the ensemble average, denoted $\overline{R^k}$, over the burst, $$\overline{R^k} = \frac{1}{N} \sum_{i=1}^{N} R^k(n), \quad (18)$$

which, for the cases k=1, 2 and 4, $$\overline{R} = \frac{1}{N} \sum_{i=1}^{N} \sqrt{(I^2(n) + Q^2(n))} \quad (19a)$$

$$\overline{R^2} = \frac{1}{N} \sum_{i=1}^{N} I^2(n) + Q^2(n), \text{ and} \quad (19b)$$

$$\overline{R^4} = \frac{1}{N} \sum_{i=1}^{N} (I^2(n) + Q^2(n))^2. \quad (19c)$$

$\overline{R^2}$ then can be used as a measure of the RSSI.

In one embodiment, an iterative solution is used in which values of $2\sigma^2$ and SINR are assumed and substituted into Equation (15) and (16), the computed value of $E\{R^2\}$ and $E\{R\}$ are compared with the estimated RSSI ($\overline{R^2}$ obtained from measurement) and $\overline{R}$, respectively, and, if the differences are acceptably small, accepting the substituted values as the solutions that lead to the SINR estimate. This is a standard iterative way of solving the two simultaneous nonlinear Equations (15) and (16).

Note that in the above, in order to estimate $E\{R\}$ from measurements, (see Equation (17a)), a square root operation needs to be performed. This is computationally expensive.

A second preferred method is based only on using the even powered non-central moments, $E\{R^2\}$ and $E\{R^4\}$, determined according to Equations (17b) and (17c). The even powered non-central moments, $E\{R^2\}$ and $E\{R^4\}$ are the mean power and the mean squared power measurements. Note that once the instantaneous power $R^2(n)=I^2(n)+Q^2(n)$ is determined (for use in Equations (17b)), determining the squared power $R^4(n)=[R^2(n)]^2$ requires only a single additional multiplication per sample, and the estimated signal-to-noise ratio is determined, preferably with at most one square root operation, using $$SINR = \frac{\sqrt{2 - \frac{\overline{R^4}}{(\overline{R^2})^2}}}{1 - \sqrt{2 - \frac{\overline{R^4}}{(\overline{R^2})^2}}} \quad (20)$$

$$= \frac{A + \sqrt{A}}{1 - A}, \text{ where } A = 2 - \frac{\overline{R^4}}{(\overline{R^2})^2}.$$

FIG. 5(a) is a block diagram of one realization of a base station apparatus (501) used for obtaining the signal quality estimates. This apparatus is a simplified version of the base station apparatus of FIGS. 1 and 2. The apparatus 501 is comprised of an antenna array 503 for receiving RF signals, a set of RF receivers 505 (i.e., antenna receive apparatuses) for converting the signals at each of the elements in antenna 503 into a complex valued baseband signals, a spatial processor 507 for determining the baseband signals from a particular remote user preferably provided as in-phase (I) component 509 and quadrature (Q) component 511, signals 509 and 511 determined substantially at the baud points. The I and Q signals 509 and 511, respectively, are fed to a signal quality estimator 513 for further processing to produce the desired signal quality estimate, shown as signal quality indicator 515 in FIG. 5(a). In the base station of the preferred embodiment, each element of antenna array 503 and each RF receiver 505 are implemented in the transceiver module shown in FIG. 1, and generate digital pre-spatial processing signals as the outputs of downconverter/filters 131. Spatial processor 507 is preferably a programmable digital arithmetic processor. When used in the base station of the preferred embodiment, spatial processor 507 is part of the modem module of FIG. 2, in particular, one of the RX DSPs 209, the particular RX DSP being the one for the slot being received. Signal quality processor 513 also is preferably a programmable digital arithmetic processor. When used in the base station of the preferred embodiment, signal quality processor 513 is part of the modem module of FIG. 2, in particular, one of the RX DSPs 209, the particular RX DSP being the one for the slot being received.

FIG. 5(*b*) is a block diagram of one realization of a subscriber unit apparatus (521) used for obtaining the signal quality estimates. This apparatus is a simplified version of the subscriber unit apparatus of FIGS. 9 and 10. The apparatus 521 is comprised of an antenna 523 for receiving RF signals, an RF receiver 525 for converting the signal from antenna 523 into a complex valued baseband signal, preferably as in-phase (I) component 529 and quadrature (Q) component 531, signals 529 and 531 determined substantially at the baud points. The I and Q signals 529 and 531, respectively, are fed to a signal quality estimator 533 for further processing to produce the desired signal quality estimate, shown as signal quality indicator 535 in FIG. 5(*b*). In the subscriber unit of the preferred embodiment, antenna 523 and RF receiver 525 are implemented in the RF system shown in FIG. 9, and generate oversampled I and Q signals. Signal quality processor 533 also is preferably a programmable digital arithmetic processor. When used in the subscriber unit of the preferred embodiment, signal quality processor 533 is DSP(RX) 1042, and its function includes determining the samples at the approximate baud points.

In the case of digital processing, signals 509 and 511 (in a BS) and signals 529 and 531 (after baud point processing by DSP(RX) 1042 in the SU) are sampled at the estimated baud points. These signals as before are denoted by I(n) and Q(n), respectively, where each successive sample n is at or close to successive baud points. The sampled modulus information is extracted by forming the sum of the squares of the in phase and quadrature signals, that is, the instantaneous power. Thus, instantaneous power $R^2(n)$ is obtained using Equation (17b), and instantaneous squared power $R^4(n)$ is obtained as $[R^2(n)]^2 = R^2(n)*R^2(n)$.

The second and fourth moments, means power $\overline{R^2}$ and mean squared power $\overline{R^4}$, respectively, are estimated by forming the averages of $R^2(n)$ and $R^4(n)$ over a moving window. Such moving averages may be determined using Equations (19b) and (19c) for the cases k=2 and k=4.

Equation (20) is now used to determine the quality estimate. In practice, as would be clear to one of ordinary skill in the art, only the summations in Equation (19b) (and Equation (19c), if used) are formed. The 1/N factor need not be determined for all averages so long as the correct scaling is maintained in the determination of the quality estimate using Equation (20).

In an improved embodiment, rather than determine the SINR over a single burst, an additional step is added of taking a moving average of SINRs over several bursts. For example, the Kth running average determined, after K bursts, as $$\text{SINR}_K = \alpha \text{SINR} + (1-\alpha) \text{SINR}_{K-1} \qquad (21)$$

where $0<\alpha<1$, SINR is the new measure for the current (Kth) burst, and $\text{SINR}_K$ denotes the Kth running average of the SINR. The value of $\alpha$ is selected to control the rate of adaptation of the moving average to changing conditions. In the preferred embodiment of a PHS system, a value of 0.8 is used for $\alpha$. As would be clear to one of ordinary skill in the art, the running average of Equation (21) is easily implemented as a finite impulse response (FIR) filter, and does not add much to the computational burden, as the data rate (a new SINR every burst) is low. The moving average preferably is implemented in signal quality processor 513 (in a base station) and processor 533 (in a SU).

FIG. 6 is a flow diagram for method 601 that summarizes the method for obtaining a signal quality estimate in angle modulated communication systems. In step 603, an angle-modulated signal is received. Step 605 generates the in-phase (I) and quadrature (Q) components of the received signal in baseband, after spatial processing in the case of SDMA, and substantially at the baud points in the case of digital processing. Step 607 extracts estimates of at least two distinct moments of the modulus of the received signal from the I, Q components, and step 609 determines averages of the moments. Step 611 determines the signal quality estimate as the SINR estimate.

The methods and apparatuses described herein for controlling transmitter power level were, for sake of clarity, limited to specific cellular communication systems and implementations. For those of ordinary skill in the art, the application of the invention to other communication systems, such systems that use other air interfaces, systems that are designed for data transmission, analog systems, wireless local area networks (LANs), etc., will become evident from the description provided without departing from the spirit and scope of the invention which should only be limited as set forward in the claims that follow. Also, the specific methods and apparatuses described for estimating the quality of a received angle-modulated RF carrier was by way of example only and should not be limited except as set forward in the claims that follow.

The elements of embodiments are also provided as a machine-readable storage medium comprising data that when operated on by a machine causes the machine to perform operations comprising: transmitting a first radio signal from a first radio station to a second radio station, the first signal being sent according to a first power assignment and a first spatial weight vector; receiving from the second radio station a quality of the first signal; determining a second power assignment based on the received quality of the first signal; and transmitting a second radio signal from the first radio station to the second radio station using the second power assignment. In one embodiment, the operations performed by the machine further comprise: determining a second spatial weight vector at the first station based on the received quality of the first signal; and wherein transmitting the second signal comprises transmitting the second signal using the second power assignment and the second spatial weight vector.

In one embodiment, the operations performed by the machine further comprise: repeating at least a portion of: transmitting an additional radio signal to the second station; receiving a quality of the additional signal from the second station; determining an additional power assignment based on the received quality; determining an additional spatial weight vector based on the received quality; and transmitting an additional signal to the second station using the determined additional power assignment and the determined additional spatial weight vector.

What is claimed is:

1. A method comprising:
   transmitting a first radio signal from a first radio station to a second radio station, the first signal being sent according to a first power assignment and a first spatial weight vector;
   receiving from the second station a quality of the first signal;
   determining at the first station a second power assignment based on the received quality of the first signal; and
   transmitting a second radio signal from the first station to the second station using the second power assignment.

2. The method of claim 1, further comprising:
   determining a second spatial weight vector at the first station based on the received quality of the first signal,
   wherein transmitting the second signal comprises transmitting the second signal using the second power assignment and the second spatial weight vector.

3. The method of claim 2, wherein the second power assignment is applied as a scaling factor to the second spatial weight vector.

4. The method of claim 1, further comprising:
   setting up an initial power assignment and spatial weight vector as the first power assignment and the first spatial weight vector, the initial assignments being the same for all radios to which the first station transmits a first signal.

5. The method of claim 1, wherein receiving from the second station comprises receiving an uplink signal.

6. A machine-readable storage medium comprising data that when operated on by a machine causes the machine to perform operations comprising:
   transmitting a first radio signal from a first radio station to a second radio station, the first signal being sent according to a first power assignment and a first spatial weight vector;
   receiving from the second radio station a quality of the first signal;
   determining a second power assignment based on the received quality of the first signal; and
   transmitting a second radio signal from the first radio station to the second radio station using the second power assignment.

7. The machine-readable storage medium of claim 6, the operations further comprising:
   determining a second spatial weight vector at the first station based on the received quality of the first signal, wherein transmitting the second signal comprises transmitting the second signal using the second power assignment and the second spatial weight vector.

8. The machine-readable storage medium of claim 6, the operations further comprising:
   repeating at least a portion of:
      transmitting an additional radio signal to the second station; receiving a quality of the additional signal from the second station;
      determining an additional power assignment based on the received quality;
      determining an additional spatial weight vector based on the received quality; and
   transmitting an additional signal to the second station using the determined additional power assignment and the determined additional spatial weight vector.

9. A radio station comprising:
   a transmitter to transmit a first radio signal from the radio station to a second radio station, the first signal being sent according to a first power assignment and a first spatial weight vector;
   a receiver to receive from the second radio station a quality of the first signal; and
   a signal processor to determine a second power assignment based on the received quality of the first signal,
   wherein the transmitter is further operable to transmit a second radio signal from the first radio station to the second radio station using the second power assignment.

10. The radio station of claim 9, wherein the signal processor is further to determine a second spatial weight vector based on the received quality of the first signal, wherein the transmitter is further to transmit the second signal using the second power assignment and the second spatial weight vector.

11. The radio station of claim 10, wherein the signal processor applies the second power assignment as a scaling factor to the second spatial weight vector.

12. The radio station of claim 9, wherein the transmitter transmits to a plurality of second radio stations as a base station in cellular radio communication system and wherein the signal processor further sets up an initial power assignment and spatial weight vector as the first power assignment and the first spatial weight vector, the initial assignments being the same for all radios to which the transmitter transmits a first signal.

* * * * *